(12) United States Patent
Eaton

(10) Patent No.: US 7,805,854 B2
(45) Date of Patent: Oct. 5, 2010

(54) SYSTEMS AND METHODS FOR POSITIONING AND MEASURING OBJECTS USING A CMM

(75) Inventor: Homer Eaton, Carlsbad, CA (US)

(73) Assignee: Hexagon Metrology, Inc., North Kingstown, RI (US)

( * ) Notice: Subject to any disclaimer, the term of this patent is extended or adjusted under 35 U.S.C. 154(b) by 450 days.

(21) Appl. No.: 11/749,000

(22) Filed: May 15, 2007

(65) Prior Publication Data
US 2007/0261259 A1 Nov. 15, 2007

Related U.S. Application Data

(60) Provisional application No. 60/800,336, filed on May 15, 2006.

(51) Int. Cl.
*G01B 5/20* (2006.01)

(52) U.S. Cl. .......................................... 33/551; 33/503

(58) Field of Classification Search ........... 33/549–554, 33/1 M, 559, 573
See application file for complete search history.

(56) References Cited

U.S. PATENT DOCUMENTS

| | | |
|---|---|---|
| 5,084,981 A | 2/1992 | McMurtry et al. |
| 5,088,337 A | 2/1992 | Bennett |
| 5,148,377 A | 9/1992 | McDonald |
| 5,187,874 A | 2/1993 | Takahashi et al. |
| 5,189,797 A | 3/1993 | Granger |
| 5,396,712 A | 3/1995 | Herzong |
| 5,408,754 A | 4/1995 | Raab |
| 5,412,880 A | 5/1995 | Raab |
| 5,505,003 A | 4/1996 | Evans et al. |
| 5,510,977 A | 4/1996 | Raab |
| 5,521,847 A | 5/1996 | Ostrowski et al. |
| 5,528,505 A | 6/1996 | Granger et al. |
| 5,611,147 A | 3/1997 | Raab |
| 5,615,489 A | 4/1997 | Breyer et al. |
| 5,757,499 A | 5/1998 | Eaton |
| 5,768,792 A | 6/1998 | Raab |
| 5,822,450 A | 10/1998 | Arakawa et al. |
| 5,829,148 A | 11/1998 | Eaton |
| 5,978,748 A | 11/1999 | Raab |
| 5,991,704 A | 11/1999 | Rekar et al. |
| 6,134,506 A | 10/2000 | Rosenberg et al. |

(Continued)

FOREIGN PATENT DOCUMENTS

DE     4345091 A1     7/1995

(Continued)

*Primary Examiner*—Yaritza Guadalupe-McCall
(74) *Attorney, Agent, or Firm*—Knobbe, Martens, Olson & Bear LLP

(57) ABSTRACT

Objects having complex geometries, such as tubular segments with multiple bends, can be measured using a system including a coordinate measurement machine. The system can include multiple supports for the object to reduce error due to sag of an object under its own weight. The supports can include positionable support members formed of metal tape. The system can further include a processor configured to determine one or more support locations for the object based on a set of definition data for the object. With support locations for the object have been determined and supports placed, the object can be measured, and a post-comparison operation can be performed. Where the object differs greatly from the definition data, the support locations can be revised.

19 Claims, 13 Drawing Sheets

U.S. PATENT DOCUMENTS

| | | |
|---|---|---|
| 6,161,079 A | 12/2000 | Zink et al. |
| 6,219,928 B1 | 4/2001 | Raab et al. |
| 6,366,831 B1 | 4/2002 | Raab |
| 6,668,466 B1 | 1/2003 | Lothar |
| 6,598,306 B2 | 7/2003 | Eaton |
| 6,611,346 B2 | 8/2003 | Granger |
| 6,611,617 B1 | 8/2003 | Crampton |
| 6,618,496 B1 | 9/2003 | Tassakos et al. |
| 6,817,108 B2 | 11/2004 | Eaton |
| 6,842,995 B2 * | 1/2005 | Jones et al. .................. 33/549 |
| 6,892,465 B2 | 5/2005 | Raab et al. |
| 6,904,691 B2 | 6/2005 | Raab et al. |
| 6,925,722 B2 | 8/2005 | Raab et al. |
| 6,931,745 B2 | 8/2005 | Granger |
| 6,952,882 B2 | 10/2005 | Raab et al. |
| 6,984,236 B2 | 1/2006 | Raab |
| 6,988,322 B2 | 1/2006 | Raab et al. |
| 7,003,892 B2 | 2/2006 | Eaton et al. |
| 7,017,275 B2 | 3/2006 | Raab et al. |
| 7,043,847 B2 | 5/2006 | Raab et al. |
| 7,047,657 B2 * | 5/2006 | Goeggelmann et al. ....... 33/552 |
| 7,051,450 B2 | 5/2006 | Raab et al. |
| 7,073,271 B2 | 7/2006 | Raab et al. |
| 7,152,456 B2 | 12/2006 | Eaton |
| 7,174,651 B2 | 2/2007 | Raab et al. |
| 7,243,438 B2 * | 7/2007 | Jaubert ........................ 33/551 |
| 7,246,030 B2 | 7/2007 | Raab et al. |
| 7,269,910 B2 | 9/2007 | Raab et al. |
| 7,296,979 B2 | 10/2007 | Raab et al. |
| 7,372,581 B2 | 5/2008 | Raab et al. |
| 7,395,606 B2 | 7/2008 | Crampton |
| 2003/0005594 A1 * | 1/2003 | Recupero ..................... 33/549 |
| 2007/0063500 A1 | 3/2007 | Eaton |
| 2008/0201974 A1 * | 8/2008 | Kato .......................... 33/551 |

FOREIGN PATENT DOCUMENTS

| | | |
|---|---|---|
| DE | 101 12 977 | 11/2002 |
| EP | 0522610 A1 | 6/1992 |
| FR | 2740546 | 1/1998 |
| GB | 2274526 A | 7/1994 |
| JP | 404057690 | 2/1992 |
| JP | 04-032393 | 5/1992 |
| JP | 05-031685 | 2/1993 |
| JP | 2003-021133 | 1/2003 |
| JP | 2003/175484 | 9/2003 |
| JP | 2003275484 | 9/2003 |
| JP | 2006-214559 | 8/2006 |
| WO | WO 98/08050 | 2/1998 |

* cited by examiner

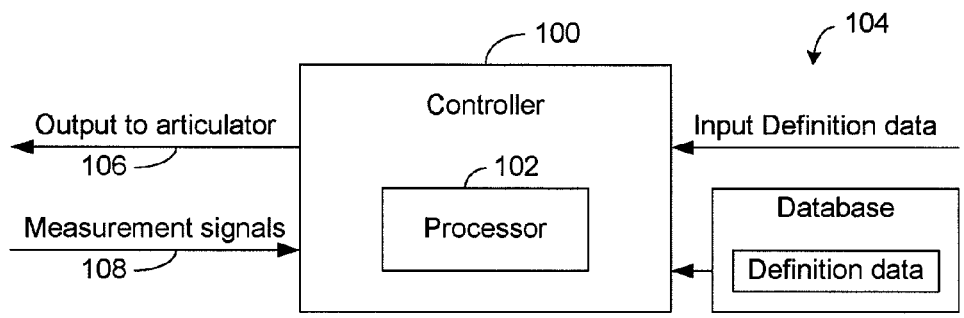
FIG. 1
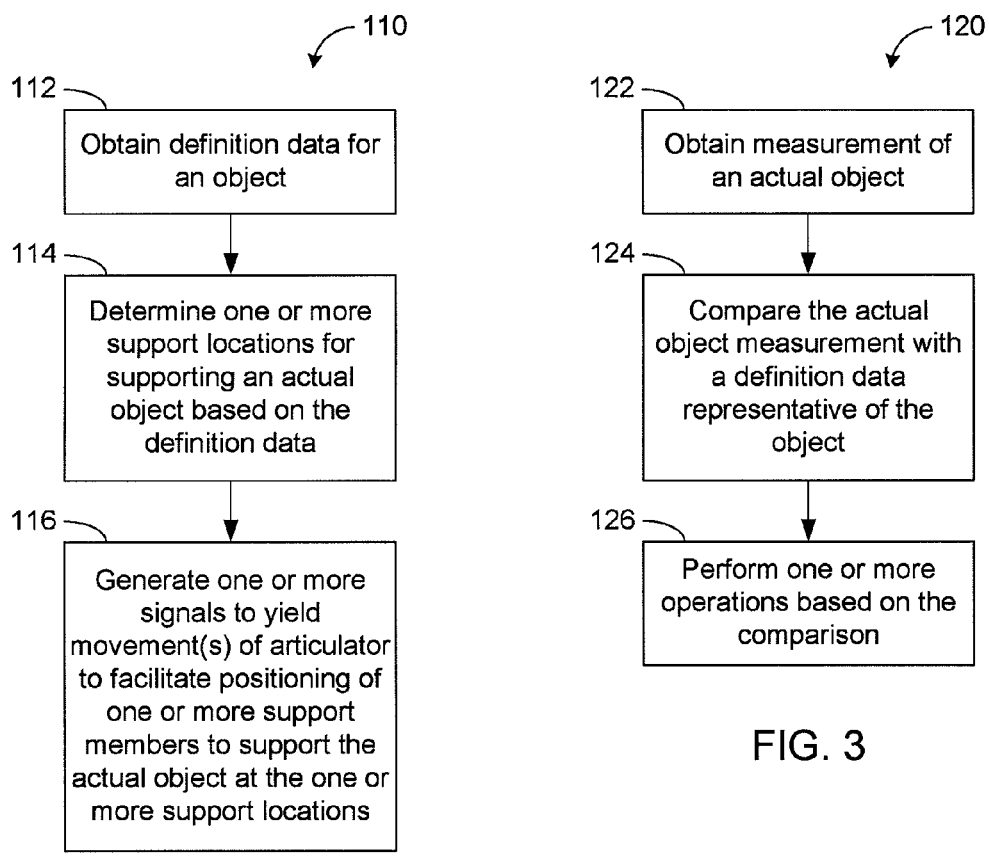
FIG. 2
FIG. 3

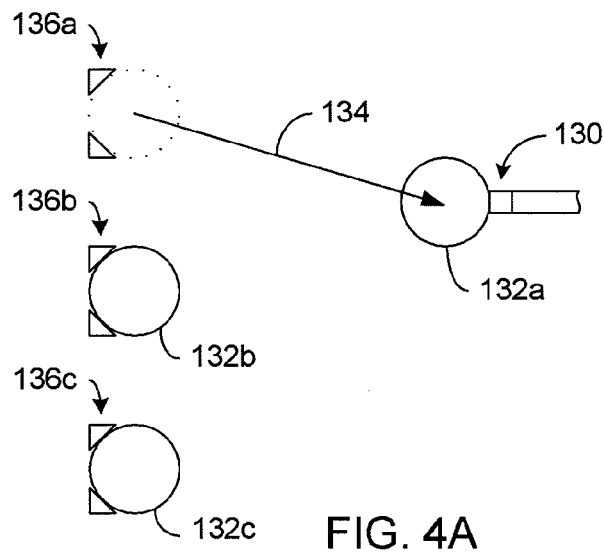
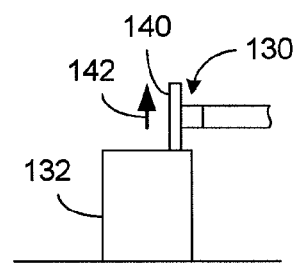
FIG. 4A
FIG. 4B
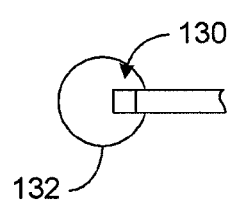
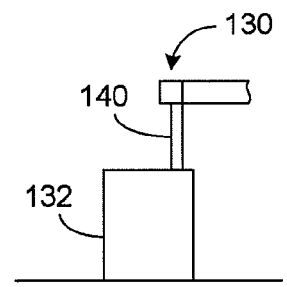
FIG. 5A
FIG. 5B

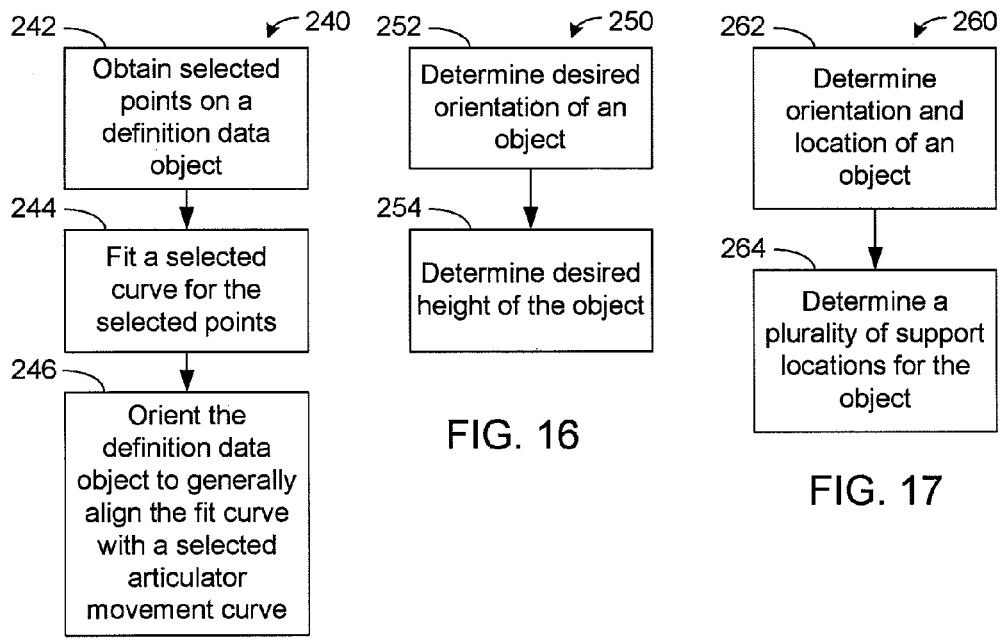
FIG. 15
FIG. 16
FIG. 17
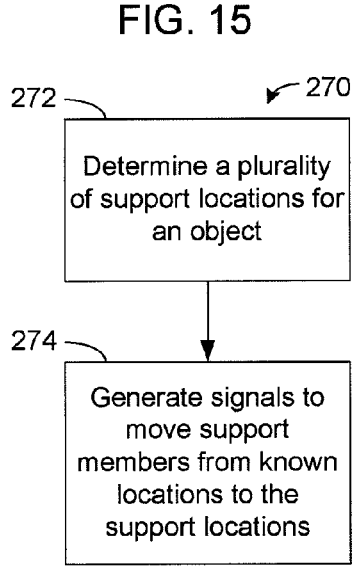
FIG. 18
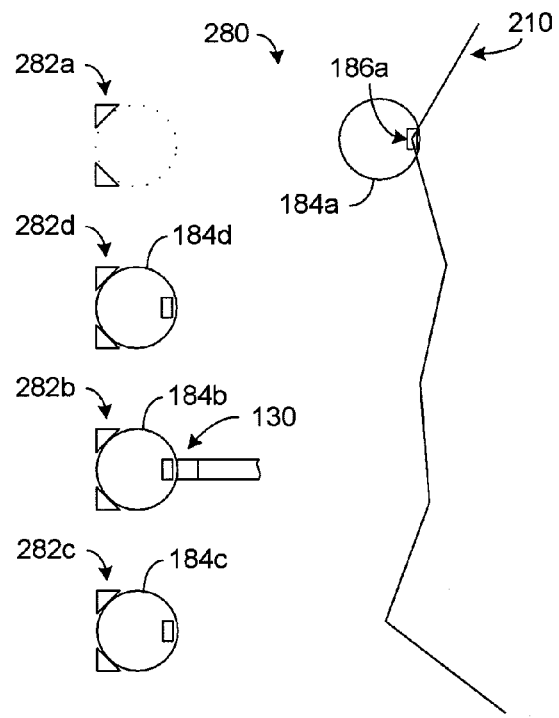
FIG. 19

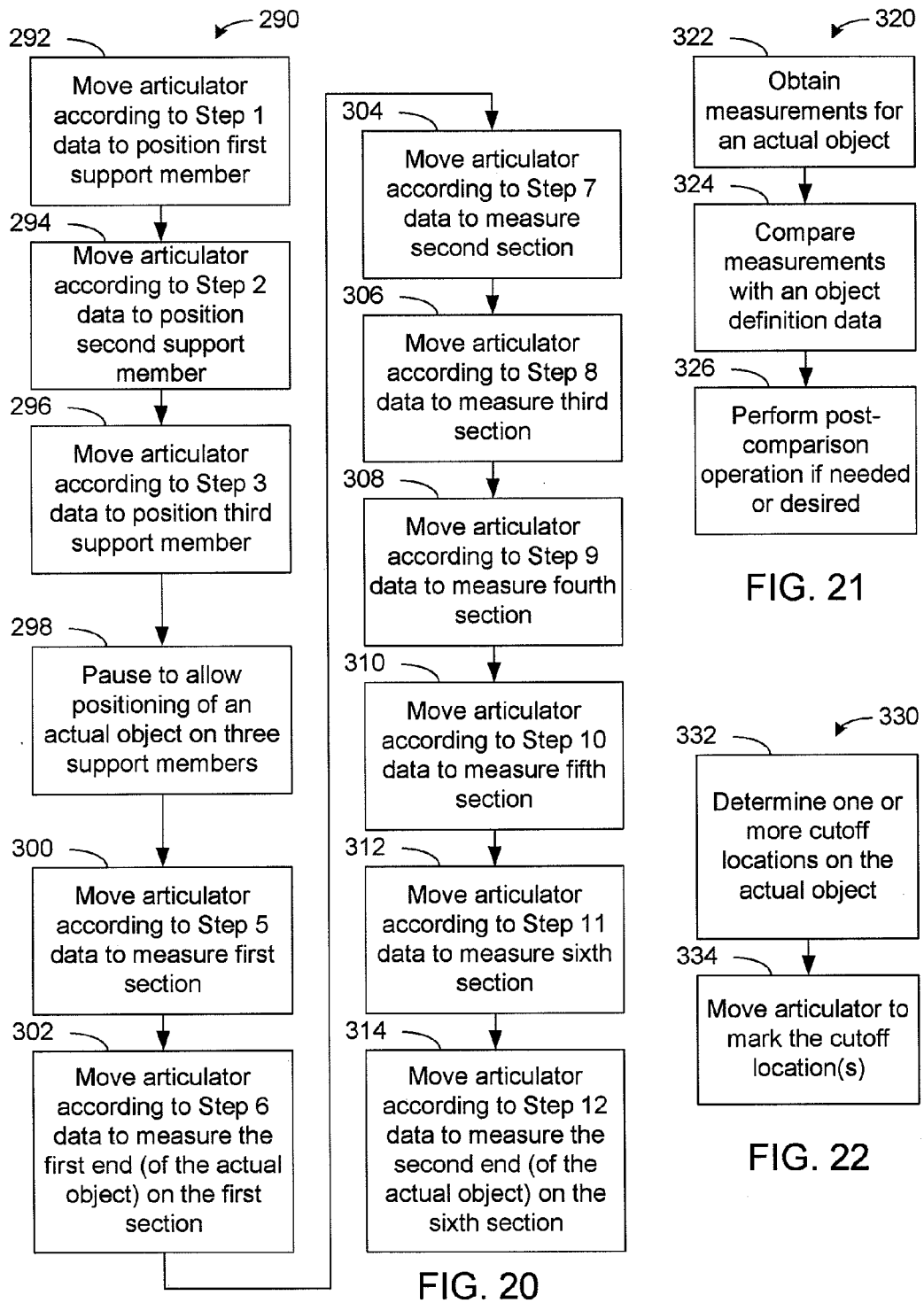

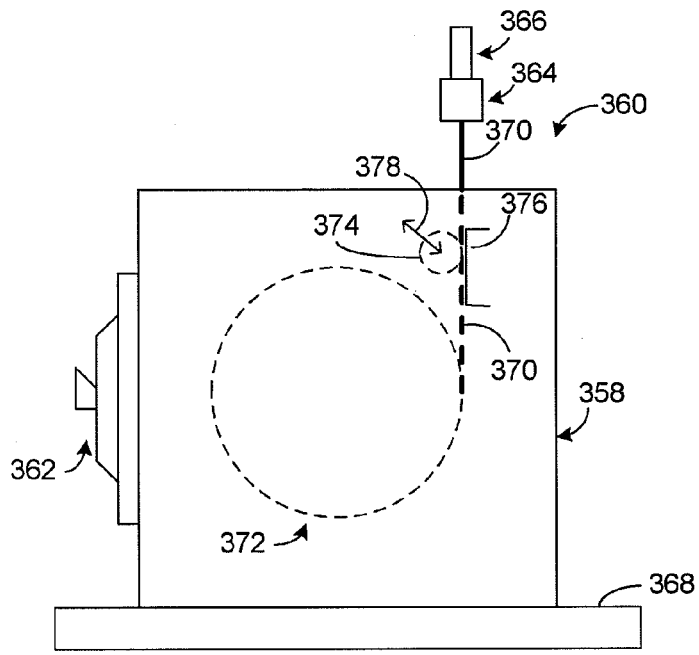
FIG. 24
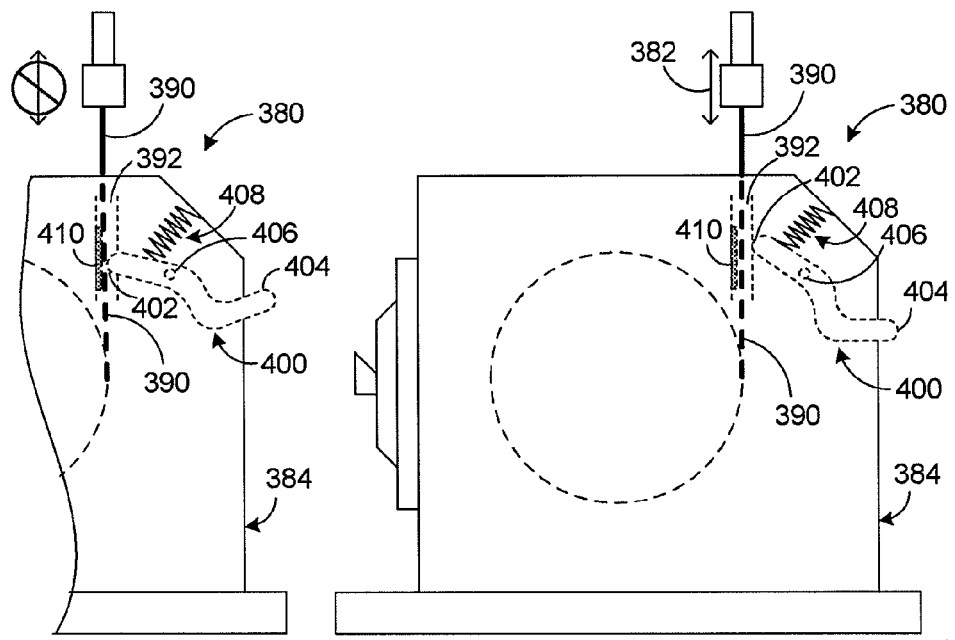
FIG. 25A
FIG. 25B

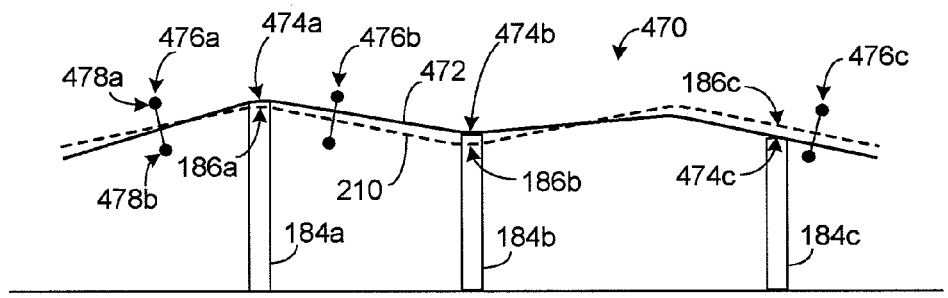
FIG. 27A
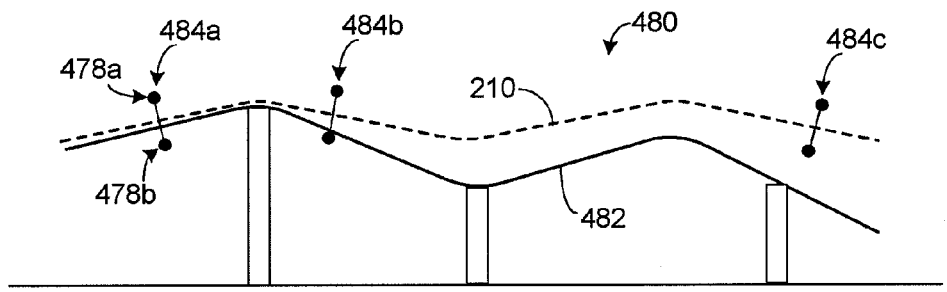
FIG. 27B
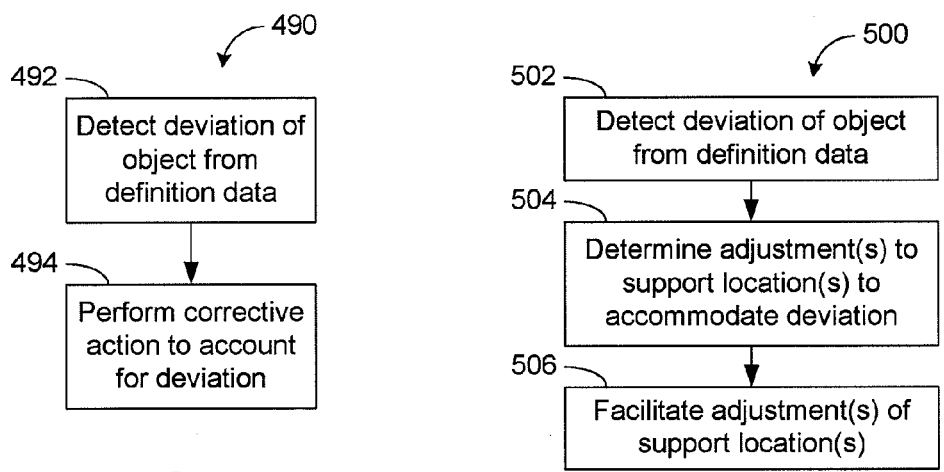
FIG. 28
FIG. 29

SYSTEMS AND METHODS FOR POSITIONING AND MEASURING OBJECTS USING A CMM

CROSS-REFERENCE TO RELATED APPLICATIONS

This application claims the benefit of U.S. Provisional Patent Application No. 60/800,336, entitled "SYSTEMS AND METHODS FOR POSITIONING AND MEASURING OBJECTS USING A CMM," filed on May 15, 2006.

Also, this application hereby incorporates by reference the above-identified provisional application, in its entirety.

LIMITED COPYRIGHT AUTHORIZATION

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

BACKGROUND OF THE INVENTION

1. Field of the Invention

The present disclosure generally relates to articulated arm coordinate measuring machines, and in particular, to systems and methods for positioning objects for measurements with coordinate measuring machines.

2. Description of the Related Art

Various objects, including tubular objects having multiple bends, can be measured with coordinate measuring machines. Tubular objects having multiple bends can be supported by a clamp near the center of gravity of the object while measurements are made.

SUMMARY OF THE INVENTION

One embodiment of the present teachings relates to a system for providing support for an object to be measured by an articulator. The system includes a definition data. The system further includes a controller configured so as to determine one or more support locations for the object based on the definition data.

In one embodiment, the one or more support locations are determined based on determination of a selected desired orientation and position of the object. In one embodiment, the orientation and position are determined based on a selected preferred range of motion for the articulator.

In one embodiment, the system further includes one or more support members that can be moved to the support locations to provide the support for the object. In one embodiment, the one or more support members are moved by the articulator based on known starting locations of the one or more support members and the one or more support locations. In one embodiment, the one or more support members are moved manually to the one or more support locations, with the movements facilitated by the articulator being positioned at the one or more support locations.

In one embodiment, each of the one or more support members includes a base that allows lateral movement or the support member, and a retractable member that provides adjustable height for the support location corresponding to the support member. In one embodiment, the retractable member includes a retractable tape.

In one embodiment, the support member further includes a blocking member that inhibits downward movement of the retractable member. In one embodiment, the blocking member is actuated by the articulator. In one embodiment, the support member further includes a stability enhancing member that selectively provides additional stability of the support member.

In one embodiment, the system further includes a return facilitating member disposed on the support member and a nesting assembly configured to receive the return facilitating member.

In one embodiment, the controller is further configured so as to obtain measurements of the object by movements of the articulator, where the articulator movements are based on the definition data. In one embodiment, the controller is further configured so as to compare the object measurements with the definition data. In one embodiment, the controller is further configured so as to perform a post-comparison operation. In one embodiment, the post-comparison operation includes identifying of differences between the object measurements and the definition data. In one embodiment, the post-comparison operation includes marking of the object based on the comparison. In one embodiment, the controller is further configured so as to adjust the articulator movements to account for deviations of the object from the definition data.

One embodiment of the present disclosure relates to a method for providing support for an object to be measured by an articulator. The method includes obtaining a definition data. The method further includes determine one or more support locations for the object based on the definition data.

In one embodiment, the one or more support locations are determined based on determination of a selected desired orientation and position of the object. In one embodiment, the orientation and position are determined based on a selected preferred range of motion for the articulator.

In one embodiment, the method further includes generating signals for the articulator, the signals resulting in movements of one or more support members to the support locations to provide the support for the object. In one embodiment, the one or more support members are moved by the articulator based on known starting locations of the one or more support members and the one or more support locations. In one embodiment, the one or more support members are moved manually to the one or more support locations, with the movements facilitated by the articulator being positioned at the one or more support locations.

In one embodiment, the method further includes obtaining measurements of the object by movements of the articulator, where the articulator movements are based on the definition data. In one embodiment, the method further includes comparing the object measurements with the definition data. In one embodiment, the method further includes performing a post-comparison operation. In one embodiment, the post-comparison operation includes identifying of differences between the object measurements and the definition data. In one embodiment, the post-comparison operation includes marking of the object based on the comparison. In one embodiment, the method further includes adjusting the articulator movements to account for deviations of the object from the definition data.

One embodiment of the present disclosure relates to a system for operating an articulator. The system includes means for obtaining definition data. The system further includes means for determining one or more support locations for an object to be measured by the articulator based on the definition data.

BRIEF DESCRIPTION OF THE DRAWINGS

FIG. 1 shows a block diagram of one embodiment of a control system for an articulator;

FIG. 2 shows one embodiment of a process that can be performed by the control system to determine one or more support locations for supporting an object based on a definition data of the object;

FIG. 3 shows one embodiment of a process that can be performed by the control system once the object is supported at the support locations determined by the process of FIG. 2;

FIGS. 4A and 4B show that in one embodiment, the control system can generate signals that result in the articulator positioning support members at the support locations;

FIGS. 5A and 5B show that in one embodiment, the control system can generate signals that result in the articulator aiding in manual positioning of support members at the support locations;

FIG. 15 shows one embodiment of a process that can determine the example selected orientation of FIG. 12;

FIG. 16 shows one embodiment of a process that can determine the selected location of FIG. 13;

FIG. 17 shows one embodiment of a process that can determine the selected support locations of FIG. 14;

FIG. 18 shows one embodiment of a process that generates signals to move a plurality of support members from known storage locations to the selected support locations;

FIG. 19 shows an example movement of the support members of FIG. 18;

FIG. 20 shows an example process for positioning of three example support member and measuring of the example object of FIG. 11;

FIG. 21 shows one embodiment of a process that compares the measurement of the object with the definition data and performs a post-comparison operation;

FIG. 22 shows one embodiment of a process that performs an example post-comparison operation where marks are made at locations for cutting off of end tabs that were used for manufacturing and handling;

FIG. 24 shows a cut-away depiction of one embodiment of the support member;

FIGS. 25A and 25B show cut-away depictions of another embodiment of the support member;

FIG. 27A shows an example situation where the object being measured can be deviate significantly from the definition data, and where the support locations can be adjusted based on such deviation to facilitate measurements of the object;

FIG. 27B shows an example situation where the object being measured can be deviate significantly from the object data, such that if the articulator moves according to the definition data, it can either contact the object and/or miss the object;

FIG. 28 shows one embodiment of a process that can perform a corrective action to account for deviations such as those of FIGS. 27A and 27B;

FIG. 29 shows one embodiment of a process that can adjust support locations to account for the example situation of FIG. 27A;

These and other aspects, advantages, and novel features of the present disclosure will become apparent upon reading the following detailed description and upon reference to the accompanying drawings. In the drawings, similar elements have similar reference numerals.

DETAILED DESCRIPTION OF SOME EMBODIMENTS

Figure 6:
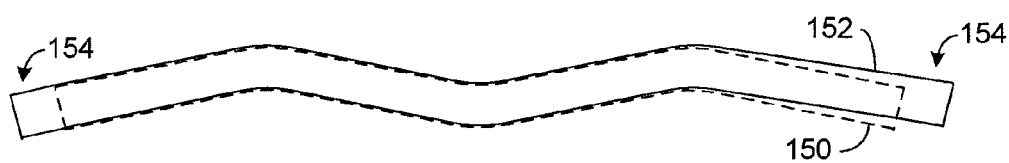
FIG. 6 shows an example comparison of an example object with a depiction of the object's corresponding definition data, showing that similar comparison can be made by the process of FIG. 3.

The present teachings generally relate to systems and methods for positioning objects for measurements with articulators. In the description herein, an articulator may also be referred to as a CMM (coordinate measuring machine).

FIG. 1 shows a block diagram of one embodiment of a controller 100 that can receive definition data 104 and generate output signals 106 that result in movements of an articulator. As described herein, such movements can either position one or more support members at selected locations, or facilitate such positioning of the support members.

In one embodiment, the definition data 104 can be input to the controller 100, obtained from a database, or any combination thereof. In one embodiment, the controller 100 includes a processor 102 that can be configured so as to generate the output signals 106 based on the definition data 104. Examples of the definition data and data corresponding to the output signals are described below in greater detail.

In one embodiment, the controller 100 can also be configured to receive measurement signals 108 from the articulator. As described herein, the output signals 106 can facilitate positioning of an object for measurement based on the corresponding definition data 104. Once the object is positioned, the articulator under the control of the controller 100 can measure the object to yield the measurement signals 108. Such measurement of the object can be compared to the definition data 104. As described herein, such comparison can be used as a quality control technique where the actual dimensions of the object (that was fabricated based on the definition data) is compared to the "ideal" dimensions defined in the definition data. For such comparison, as one can appreciate, it is desirable to have the object positioned in a stable and consistent manner for measurement. Various features of the present disclosure facilitate such positioning and measurement of the object to be measured.

For the purpose of description herein, the processor 102 can include one or more processing devices. Thus, for example, the generation of the output 106 and the analysis of the measurement signals can be performed by one processing device or a plurality of separate processing devices. Similarly, the controller 100 can include one or more devices, and/or one or more processes, and/or any combination thereof.

In general, it will be appreciated that the processors can include, by way of example, computers, program logic, or other substrate configurations representing data and instructions, which operate as described herein. In other embodiments, the processors can include controller circuitry, processor circuitry, processors, general purpose single-chip or multi-chip microprocessors, digital signal processors, embedded microprocessors, microcontrollers and the like.

Furthermore, it will be appreciated that in one embodiment, the program logic may advantageously be implemented as one or more components. The components may advantageously be configured to execute on one or more processors. The components include, but are not limited to, software or hardware components, modules such as software modules, object-oriented software components, class components and task components, processes methods, functions, attributes, procedures, subroutines, segments of program code, drivers, firmware, microcode, circuitry, data, databases, data structures, tables, arrays, and variables.

FIG. 2 shows one embodiment of a process 110 that can be performed by the processor 102 of FIG. 1 to generate the output signals 106 for the articulator. In a process block 112, definition data for an object is obtained. In a process block 114, one or more support locations for supporting an actual object are determined based on the definition data. In a process block 116, one or more signals are generated to yield movement(s) of an articulator to facilitate positioning of one or more support members to support the actual object at the one or more support locations.

FIG. 3 shows one embodiment of a process 120 that can be performed by the processor 102 of FIG. 1 for processing of the measurement signals 108 from the articulator. In a process block 122, measurement of an actual object is obtained. In a process block 124, the actual object measurement is compared with a definition data representative of the object. In a process block 126, one or more operations can be performed based on the comparison. Examples of such post-comparison operations are described below in greater detail.

FIGS. 4A and 4B show that in one embodiment, an articulator 130 can be moved (due to the output signals 106 of FIG. 1, and the process block 116 of FIG. 2) so as to move a plurality of support members 132 to selected locations. FIG. 4A shows that the support member 132a has been moved (depicted by an arrow 134) from its "nest" (a storage location) 136a to its selected location by the articulator 130. Other support members 132b and 132c, in their respective nests 136b and 136c, can also be moved to their respective selected locations in a similar manner.

FIG. 4B shows that in one embodiment, the support member 132 can include a height-adjustable member 140 whose height is being adjusted (depicted by an arrow 142) by the articulator 130. If the top portion of the member 140 is to provide support for the object (not shown), the member 140 can be raised or lowered so as to place the top portion at the support location.

In one embodiment, the example movement 134 and the example raising/lowering movement 142 can be performed in any order. As described herein, such example movements of the articulator 130 (resulting in the movements 134 and 142 of the support member 132 and the height-adjustable member 140) can result from the output signals 106 generated by the controller 100.

In one embodiment, the articulator can be moved not to move the support member, but to facilitate accurate positioning of the support member at the support location. Thus, in FIGS. 5A and 5B, the articulator 130 is depicted as being positioned at a location so as to provide an index for positioning of the support member 132 (FIG. 5A) and for height adjustment of the member 140 (FIG. 5B). In one embodiment, the foregoing positioning and height adjustment can be performed manually.

In some embodiments, positioning and height adjustment movements can be achieved by the articulator (as in FIG. 5A). In other embodiments, positioning and height adjustment movements can be achieved manually (as in FIG. 5B). In other embodiments, positioning and height adjustment movements can be achieved by a combination thereof.

FIG. 6 shows an example object 152 that was fabricated based on a definition data that is represented as a dashed-line object 150. As the comparison shows, the fabricated object 152 may have variations (for example, at the right end) from the definition data. Such variations can result from, for example, fabrication errors, and can be detected by comparison of the object 152 measurements with the definition data 150.

As further shown in FIG. 6, some fabricated objects can include portions that aid in the fabrication, but are later removed. For example, the object 152 is shown to have end tabs 154 that extend beyond the defined ends of the definition data 150. Such end tabs 154 can aid in fabrication and handling of the object 152, and removal of such tabs can be facilitated by the articulator as described below in greater detail.

It will be understood that the definition data 150 shown in FIG. 6 is not a physical object, but rather a depiction of some data. Thus, such "virtual" object (at least to the extent used for dimensional definition) does not necessarily manifest mechanical properties, and is not necessarily affected by forces due to, for example, support and gravity. However, the actual object 152 can manifest mechanical properties, and can be affected by forces due to support and gravity.

Figure 7:
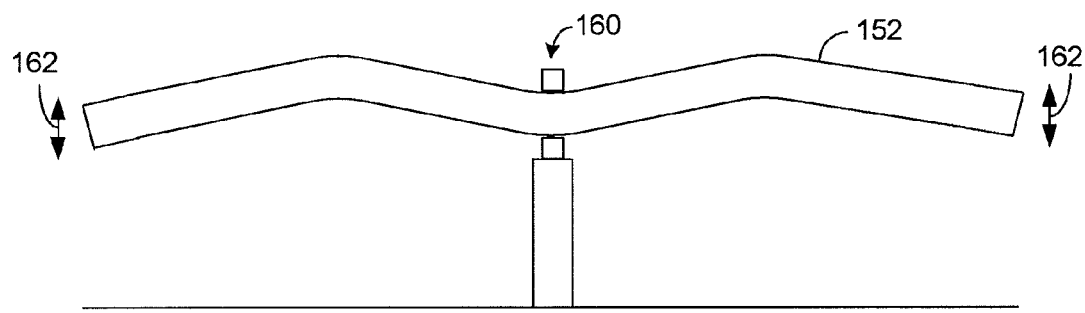
FIG. 7 shows that in a conventional supporting technique, one or more portions of the supported object can flex or sag, thereby resulting in an inaccurate comparison with the definition data.

FIG. 7 shows an example of a prior art support member 160 supporting the object 152 at a single location. Typically, such support member 160 clamps the object 152 near the object's center of gravity, after which measurements can be made with the articulator. With such a support, however, the ends of the object 152 can sag due to gravity or be susceptible to flexing motion (depicted as arrows 162). Such sagging and/or flexing motion can be significant especially if the object 152 is relatively long.

Figure 8:
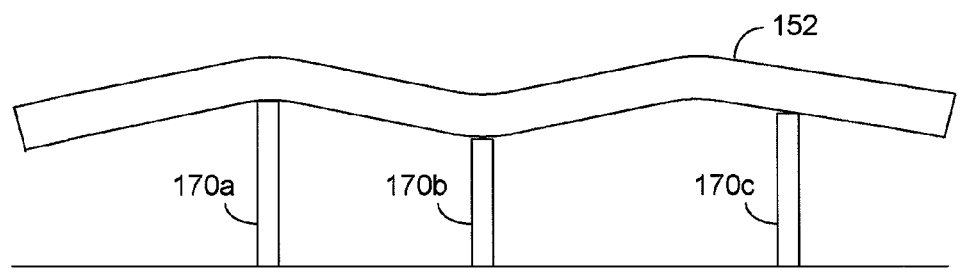
FIG. 8 shows an example of one embodiment of a supporting technique, where the object is supported at a plurality of selected locations that reduce the unwanted flexing of sagging of the object, and where such locations can be selected to facilitate measurement of the supported object.

FIG. 8 shows that by providing a plurality of supports 170 at locations distributed along the object 152, such sagging and/or flexing can be reduced. As described herein, various features of the present disclosure can determine locations of such support locations so as to position the object 152 in some selected location and orientation for measurements with the articulator. It will be understood that, although three supports are shown as an example, other numbers of supports can be used. Moreover, although multiple supports may be preferable, some features of the present disclosure do not necessarily need to have such multiple supports.

Figure 9:
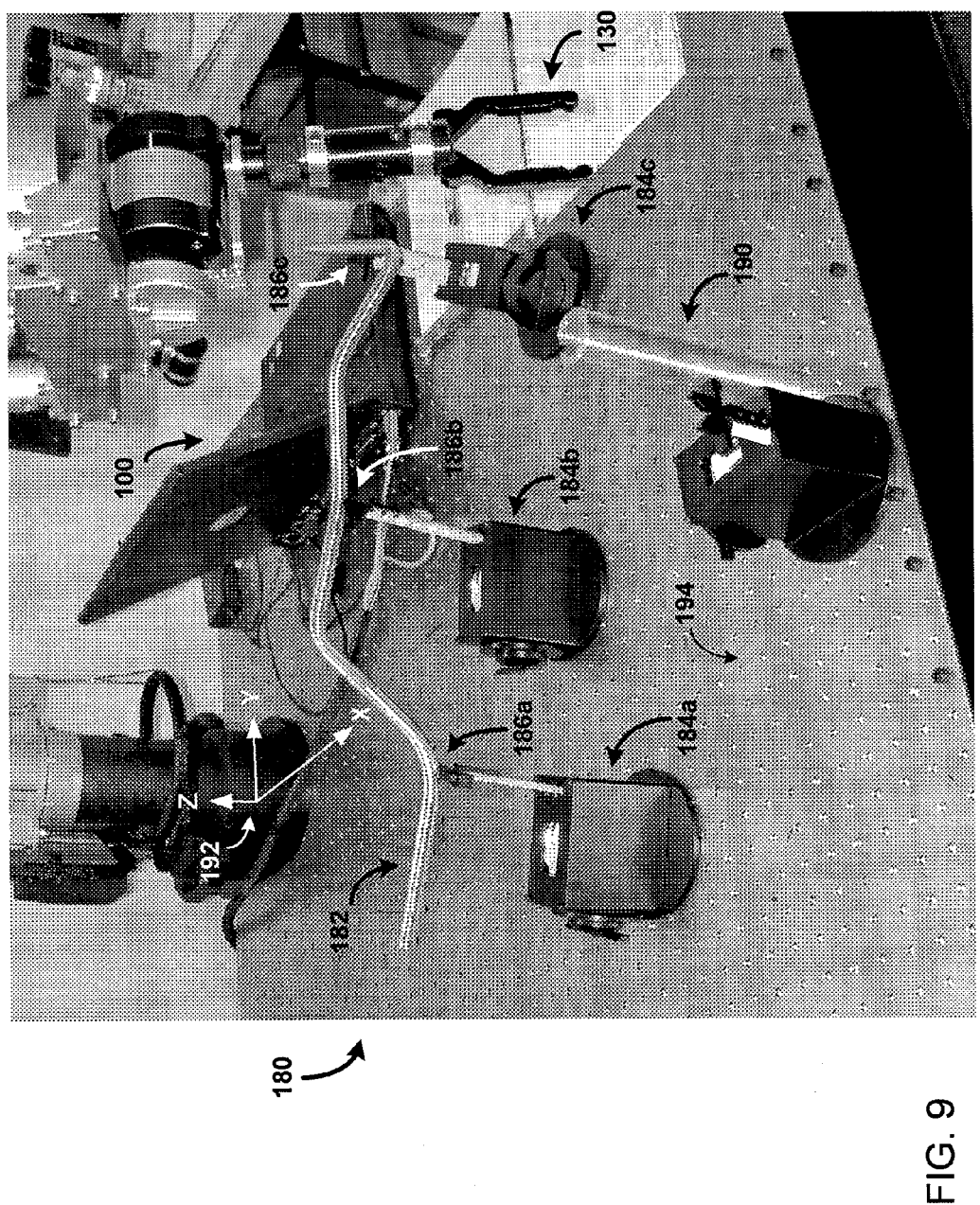
FIG. 9 shows an example where the articulator under the control of the controller has positioned the support members so as to allow positioning of the object thereon.

FIG. 9 shows a photograph of an example setup 180 where an example object 182 is shown to be supported by three example support members 184a, 184b, and 184c. The support members 184a, 184b, and 184c are shown to respectively provide support locations 186a, 186b, and 186c for the object 182. As described below in greater detail, the support locations 186a, 186b, and 186c are provided by movements of the articulator 130 under the control of the controller 100.

In FIG. 9, a marker holder 190 is also shown. The holder 190 can be configured to hold a marker and be positioned at some known location. The articulator can be instructed to pick up and move the marker and mark the object (to indicate locations for cutting off of the end tabs, for example) in a manner describe below in greater detail.

For the purpose of description, an example coordinate (x,y,z) system 192 can be defined where the X-Y plane is defined by the table-top 194, and the origin is at the rotational axis of the base member of the articulator 130. For the shown X and Y axes, the positive Z axis points upward. Other coordinate definitions are possible.

Figure 10:
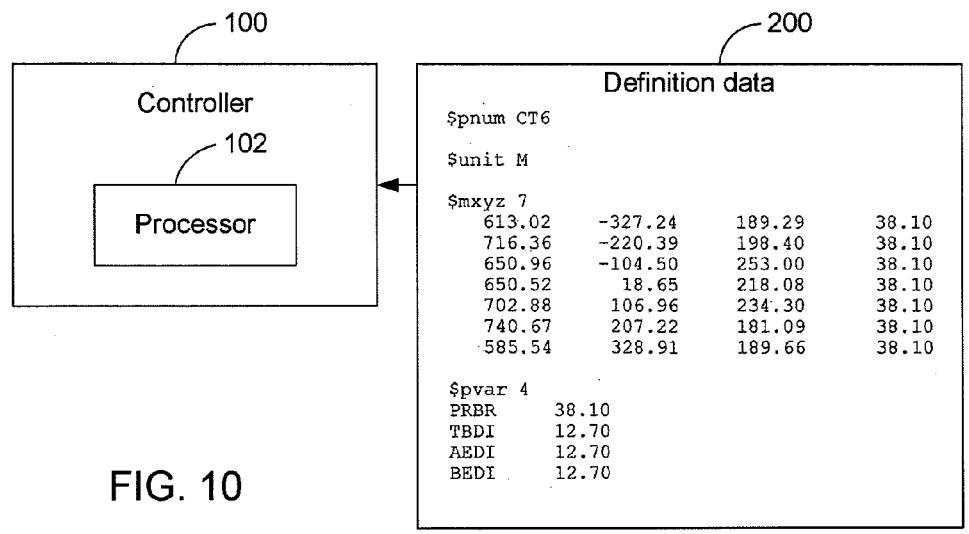
FIG. 10 shows an example definition data corresponding to the example object of FIG. 9, where the definition data is shown to be input into the controller.

As described above, the controller 100 can receive a definition data so as to generate articulator-movement signals and/or to compare with the articulator measurements of the object. FIG. 10 shows an example definition data 200 for the example object 182 shown in FIG. 9. As shown in FIG. 9, the example object 182 has six sections joined by bends. One way to define such an object is to define coordinate values for the two ends (of the object) and the five intersection points for the six sections (assuming that the sections extend straight past their respective bends). Thus, the seven rows of "mxyz" numbers indicate the (x,y,z) coordinates of the two ends and the five intersection points and the radius of curvature of the bends. For the particular example object 182, all of the bends ("PRBR") are defined to be approximately 38.10 mm.

If an object is a tubular shaped object, the definition data can also define the outer diameter and the inner diameter. For this particular example, the object 182 is a solid rod; thus, both outer ("AEDI") and inner ("BEDI") diameters are shown to be defined as being approximately 12.70 mm.

Figure 11:
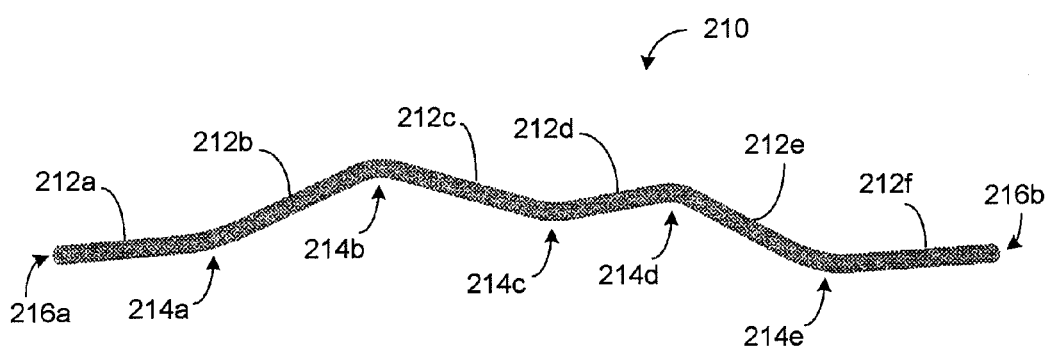
FIG. 11 shows an isolated view of a depiction of the definition data of FIG. 10.

FIG. 11 shows an isolated view of a "virtual" object 210 as defined by the example definition data 200 of FIG. 10. As shown, the six sections are indicated as 212a-f; the five bends are indicated as 214a-e; and the two object-ends are indicated as 216a and 216b. For the purpose of description herein, the two object-ends 216a and 216b, and intersection points corresponding to the bends 214a-e, are referred to as definition points for the virtual object 210.

Figure 12:
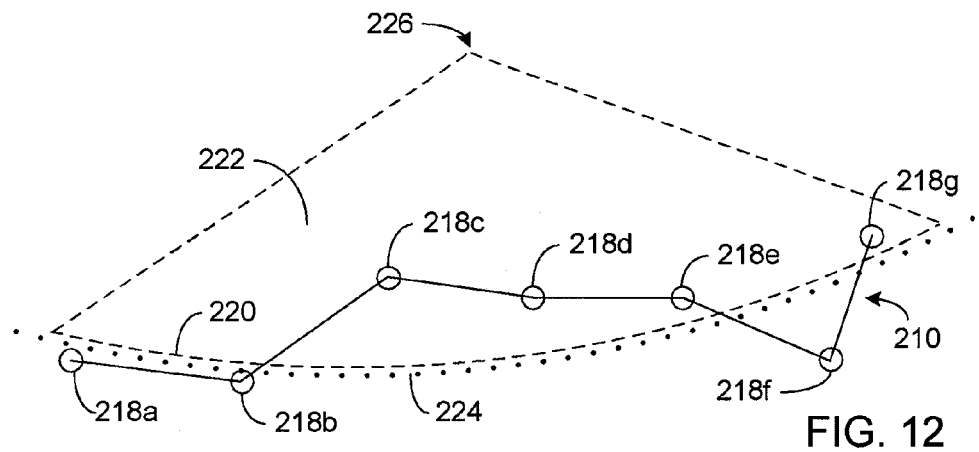
FIG. 12 shows an example of how the definition data can be used to determine the support locations so that the object supported thereon can be oriented in a selected orientation with respect to the articulator.
Figure 13:
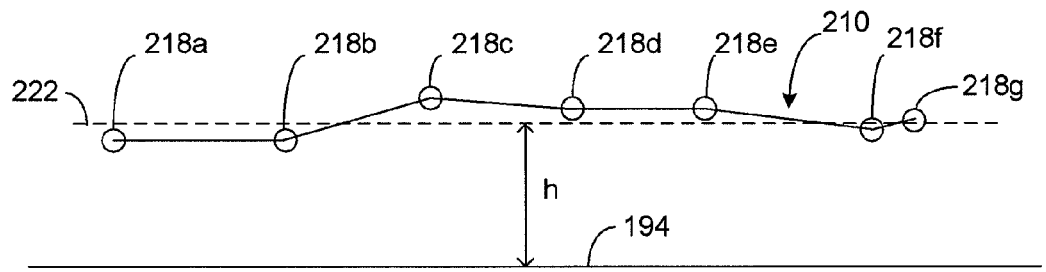
FIG. 13 shows an example of how the definition data can be used to determine the support locations so that the object supported thereon can be positioned in a selected location with respect to the articulator and a support surface.
Figure 14:
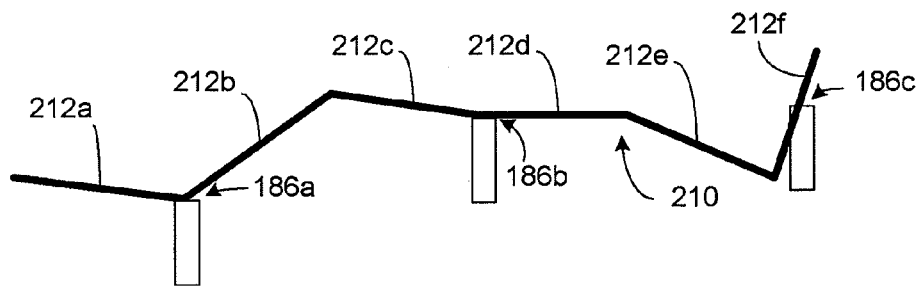
FIG. 14 shows an example of how the definition data can be used to determine selected support locations that facilitates measurement of the object supported thereon.

FIGS. 12 and 13 show how the definition data 200 can be used to determine selected orientation and location of the object to be supported for measurement. FIG. 14 shows how a plurality of support locations can be determined to support the object in such orientation and location.

FIG. 12 shows an example of how the definition points 218a-g can be used to determine a selected orientation of the virtual object 210, and thus the orientation of the actual object when positioned. In one embodiment, the coordinates of the definition points 218a-g can be fit with a selected curve 220, where the selected curve 220 can represent some preferred range of motion of the articulator. For example, the selected curve 220 can be an arc that, along with a point 226 (along the Z-axis), define a plane 222. In one embodiment, the plane 222 is substantially parallel with the table-top surface (194 in FIG. 9). The arc 220 can be made to substantially coincide with a preferred motion arc 224 of the articulator. Fitting of the arc 220 (and thus the preferred motion arc 224 of the articulator) to the definition points 218a-g can be achieved using any of a number of known techniques (for example, least-square fit). By fitting the definition points 218a-g in the foregoing manner, an object oriented accordingly can be measured in an efficient manner, since the articulator would not have to deviate much from its preferred range of motion (for example, along the motion arc 224).

FIG. 13 shows the virtual object 210 when viewed in the plane 222 and towards the point 226. The virtual object 210 is shown to be oriented in the foregoing manner so that the definition points 218a-g are generally located about the plane 222. In one embodiment, the height "h" of the plane 222 relative to the surface 194 (z=0) can be determined based on the range of adjustable heights of the support members.

FIG. 14 shows that support locations 186 can be determined for an object (depicted as the virtual object 210) in different ways. In one embodiment, a support location (186b) can be provided at or near the center of gravity of the object. Support locations (186a and 186c) can also be provided near the ends of the object so as to reduce or substantially eliminate the sagging or flexing effect. Additional support locations can be provided as needed (for example, if the object is longer and/or more flexible).

In one embodiment, as shown in FIG. 14, the support locations 186 can be determined so as to allow measurements of the object with supports positioned at such locations. For example, in one set of measurements, each of the sections (depicted as 212a-f) is measured at two points to provide directionality. Projections based on the directionalities, combined with bend-radius information, allow reconstruction of the measured object.

Thus, in such an example measurement scheme, it is not necessary to measure the bends. Accordingly, support locations can be provided at bends (for example, 186a and 186b are located at what would be bends in the actual object). Since two points are measured for a given section, it is also not necessary to measure the entire length of that section. Accordingly, a support location can be provided near a mid-way point of a section, so as to allow measurements at two points about the support location.

Different considerations can be taken into account to determine use of the foregoing example support locations. For example, if a given section is short, then it would not make sense to use the mid-section support. Also, the end sections (212a and 212f) may need to have their outer end points (218a and 218g in FIG. 13) measured. In such a situation, support should not be located at the outer end points. In FIG. 14, the example supports 186a and 186c both allow measurements of the outer ends.

FIGS. 15 and 16 show processes that can be performed by the controller to effectuate the object orientation and location configurations described by way of examples in reference to FIGS. 12 and 13. FIG. 17 shows a process that can be performed by the controller to effectuate the support location configuration described by way of example in reference to FIG. 14.

FIG. 15 shows one embodiment of a process 240 that can be performed by the controller. In a process block 242, selected points on a definition data object are obtained. For the example definition data object 210 of FIG. 12, the selected points can be the definition points 218a-g. In a process block 244, a selected curve is fit for the selected points. In one embodiment, an arc is fit for the selected points. In a process block 246, the definition data object is oriented so that the fit curve substantially coincides with a selected articulator movement curve. In one embodiment, the fit arc substantially coincides with a preferred movement arc of the articulator.

FIG. 16 shows one embodiment of a process 250 that can be performed by the controller. In a process block 252, a desired orientation of a definition data object is obtained. In one embodiment, process 240 of FIG. 15 can provide such desired orientation. In a process block 254, a desired height of the definition data object in the desired orientation is obtained.

FIG. 17 shows one embodiment of a process 260 that can be performed by the controller. In a process block 262, desired orientation and location of a definition data object are obtained. In one embodiment, processes 240 and 250 of FIGS. 15 and 16 can provide a desired orientation and a desired height, respectively. In a process block 264, a plurality of support locations are determined based on the definition data object.

FIG. 18 shows one embodiment of a process 270 that can be performed by the controller to facilitate positioning of support members according to support-locations determination. In a process block 272, a plurality of support locations for supporting an object are determined. In one embodiment, such support locations can be determined via the processes 240, 250, and 260 described above in reference to FIGS. 15-17. In a process block 272, signals are generated for movements of the articulator to move a plurality of support members from known locations to the support locations.

FIG. 19 shows an example situation 280 where support members 184a, 184b, 184c, 184d are in the process of being moved from known locations (for example, at nests 282a, 282b, 282c, 282d) to support locations. In FIG. 19, the definition data (virtual) object 210 is shown for visual reference; however, it does not exist physically.

In the example shown in FIG. 19, the first example support member 184a is depicted as being already positioned at the first support location (depicted as 186a). The articulator 130 is in the process of moving the second support member 184b from the second nest 282b to its support location. The third support member 184c is depicted as still being at the third nest 282c. In one embodiment, additional support member(s) (depicted as 184d) may be present for supporting other types of objects and/or other support configurations.

FIG. 20 shows one embodiment of a specific example process 290 that can be performed to position the three example support members at their support locations, and to perform measurements of an actual object supported thereon. The object supported at the support locations by the support members is generally depicted in FIG. 9. In the process 290, various "Step" data are referred to. Examples of such "Step" data are listed at the end of this section ("DESCRIPTION OF SOME EMBODIMENTS"). It is understood herein that although sequentially numbered, the Steps described with reference to FIG. 20 need not be performed in numerical sequence, unless described otherwise. Further, the use of the term "Step" is a convenient nomenclature defining the process herein, and, unless otherwise stated herein, is not meant to invoke the provisions of 35 U.S.C. §112, paragraph 6.

In a process block 292, the articulator is moved according to Step 1 data to position the first support member at the first support location. In a process block 294, the articulator is moved according to Step 2 data to position the second support member at the second support location. In a process block 296, the articulator is moved according to Step 3 data to position the third support member at the third support location.

In a process block 298, the process 290 can pause to allow positioning of the actual example object on the three support members. In one embodiment, the object can be placed on the support member manually. Other methods of object placement (such as automated or machine-assisted) are possible.

In a process block 300, the articulator is moved according to Step 5 data to measure the first section of the object placed on the support members. For the example object, the first section is one of the two end sections of the object. In a process block 302, the articulator is moved according to Step 6 data to measure the first outer end of the object. In a process block 304, the articulator is moved according to Step 7 data to measure the second section of the object. In a process block 306, the articulator is moved according to Step 8 data to measure the third section of the object. In a process block 308, the articulator is moved according to Step 9 data to measure the fourth section of the object. In a process block 310, the articulator is moved according to Step 10 data to measure the fifth section of the object. In a process block 312, the articulator is moved according to Step 11 data to measure the sixth section of the object. For the example object the sixth section is the other of the two end sections of the object. In a process block 314, the articulator is moved according to Step 12 data to measure the second outer end of the object. In one embodiment, such section measurements can be used to project the sections so as to determine the intersection points.

FIG. 21 shows one embodiment of a process 320 that can be performed by the controller to compare the object measurements with the definition data. In a process block 322, measurements for the object are obtained. In one embodiment, such measurements can be obtained via the example process 290 of FIG. 20. In a process block 324, the measurements are compared with the object definition data. In a process block 326, a post-comparison operation can be performed if needed or desired. For example, if the comparison shows that the measured object deviates in some manner from the definition data beyond some amount, such deviation can be identified so as to allow correction(s) to the fabrication process.

FIG. 22 shows another example of the post-comparison operation that can be performed by the controller. In a process block 332, one or more cutoff locations on the actual object are determined based on the comparison of the measurement and the definition data. For the example object, two cutoff locations are determined to allow cutting of two tabs at the ends of the object. Such cutoff locations on the actual object can be the locations corresponding to the outer end definition points in the definition data. In a process block 334, the articulator is moved to acquire a marker from a known location and mark the cutoff locations on the object. In one embodiment, the marker can be stored in the marker holder 190 whose location is known.

FIGS. 23-26 show some embodiments of the support members. FIG. 23A shows one embodiment of the support member 184 in its storage configuration 340, positioned at its nesting location 282, and with its height-adjustment member retracted. FIG. 23B shows the support member 184 in its deployed configuration 350, at its designated location, with its height-adjustment member raised so as to provide its support location 186.

Figure 23A:
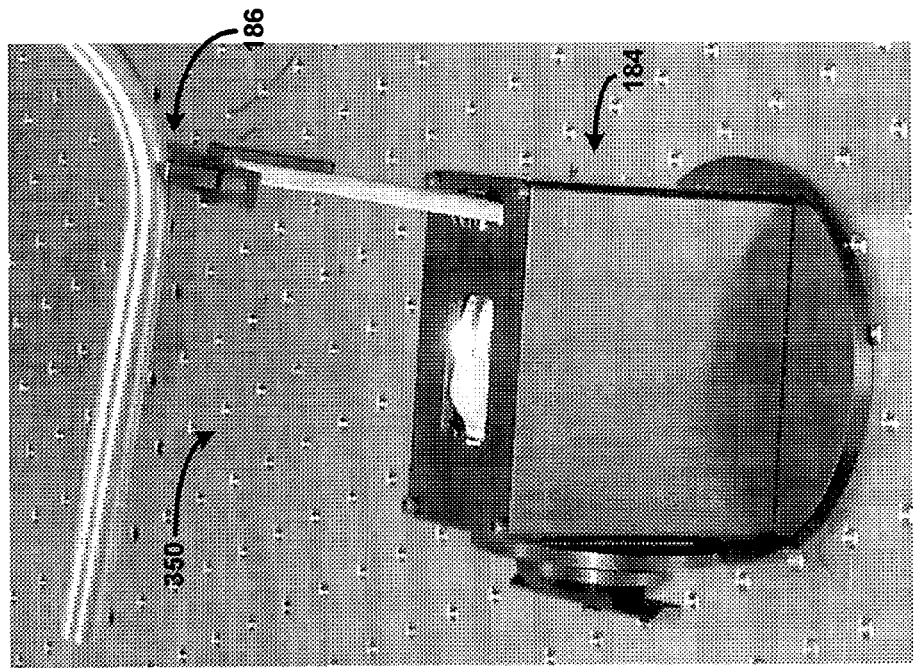
FIG. 23A shows one embodiment of an example support member in its stored configuration.
Figure 23B:
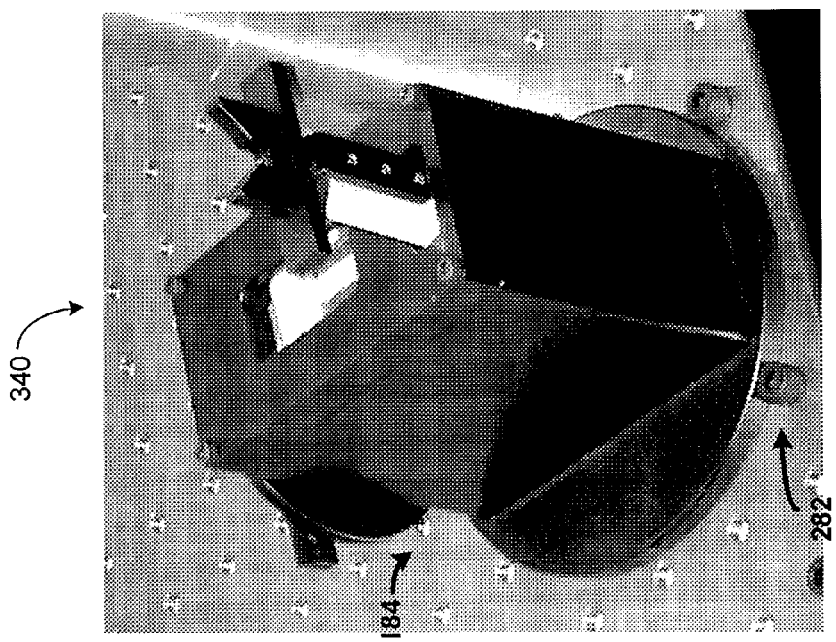
FIG. 23B shows the example support member of FIG. 23A in its deployed configuration so as to provide a support for the object being measured.

FIG. 24 shows a cutaway view of one embodiment of a support member 360 that is similar to the example support member 184 of FIGS. 23A and 23B. The support member 360 is shown as having retractable member 370 that can be raised up or down. In one embodiment, a cross bar 364 can be mounted to the end of the retractable member 370. The cross bar 364 can be dimensioned to be engaged by the articulator (not shown) so as to allow up and/or down movement of the cross bar 364. In one embodiment, a V-nest member 366 can be mounted to the cross bar 364, and the V-nest member 366 can be dimensioned to provide a support location for the object being supported. Thus, the up and/or down movement of the cross bar 364 (via the articulator or otherwise) results in similar movement of the V-nest member 366. The V-nest member 366 can be suited for receiving objects such as rod-like or tubular objects (such as the example object shown in FIG. 9). It will be understood, however, that the object engaging member 366 can be dimensioned in any manner to engage different shaped objects.

In one embodiment, the retractable member 370 can be similar to a metal tape (used for tape measures), and can be wound into a tape spool 372 within a housing 358. The spool 372 can be provided with a rewind torsion spring so as to facilitate rewinding of the tape (and thus lowering of a V-nest 366) when the support member 360 is not in use. In other embodiments, the retractable member 370 can comprise a different structure, such as a spar or tubular metal member that can be retracted or advanced. In some embodiments, the retractable member is not wound onto a spool.

In one embodiment, the support member 360 can include a retraction blocking member 374 (for example a rubber ball). In one configuration, the blocking member 374 is shown to be wedged against the tape 370 and a block 376, thereby inhibiting the tape 370 from being retracted. Such a feature can be used after the articulator moves the cross bar 364 upwards to position the V-nest member 366 at a selected height. In one configuration, the blocking member 374 can be moved (indicated by an arrow 378) away from the wedged configuration, thereby allowing retraction of the tape 370. In one embodiment, the disengagement of the blocking member 374 can be achieved manually (for example, by turning the support member upside-down).

In one embodiment, as shown in FIG. 24, the housing 358 can be mounted on a base 368. The base 368 can be configured to provide stability for the support member 360. In one embodiment, a cross bar 362 can also be mounted on the housing 358 so t as to allow the articulator to move the support member 360 as a whole.

FIGS. 25A and 25B show one embodiment of a support member 380 where the retraction inhibiting/allowing functionality can be facilitated by the articulator. The articulator can be provided with signals from the controller so as to achieve such functionality.

In one embodiment, the support member 380 includes a movable blocking member 400 that can be pivotably mounted to a housing 384 or some other structure that is substantially stationary with respect to the housing 384. The example blocking member 400 is shown to have an engaging end 402 and a control end 404, so that movement of the control end 404 results in corresponding movement of the engaging end 402 about a pivot 406.

In FIG. 25A, the engaging end 402 of the blocking member 400 is shown to engage the tape 390 and push the tape against a block 410, thereby inhibiting downward movement of the tape through a tape pathway 392. In one embodiment, the blocking member 400 can be spring biased in a selected manner. For example, a spring 408 is shown to be oriented so as to provide spring coupling between the engaging end portion of the blocking member 400 with the housing 384. Thus, when the spring 408 is in its relaxed configuration, the engaging end 402 of the blocking member 400 engages the tape 390 to inhibit the F downward movement of the tape 390. In such a configuration, the tape 390 can be moved upward (via the articulator, for example), since the upward movement of the tape 390 can result in the engaging end 402 giving due to slight compression of the spring 408. However, once the upward movement stops, the downward movement of the tape 390 is inhibited.

In FIG. 25B, the engaging end 402 of the blocking member 400 is shown to be disengaged from the tape 390, thereby allowing the downward (as well as upward) movement (indicated as an arrow 382) of the tape 390. Such disengagement of the blocking member 400 can be achieved by moving the control end 404. The movement of the control end 404 can be effectuated manually, via the articulator, or any combination thereof.

As shown in FIG. 25B, the spring 408 becomes compressed when the blocking member 400 is in the disengagement configuration. Once the tape 390 becomes retracted in such a mode, the control end 404 can be released, and the blocking member 400 will return to the engagement configuration of FIG. 25A due to the action of the spring 408.

Figure 26A:
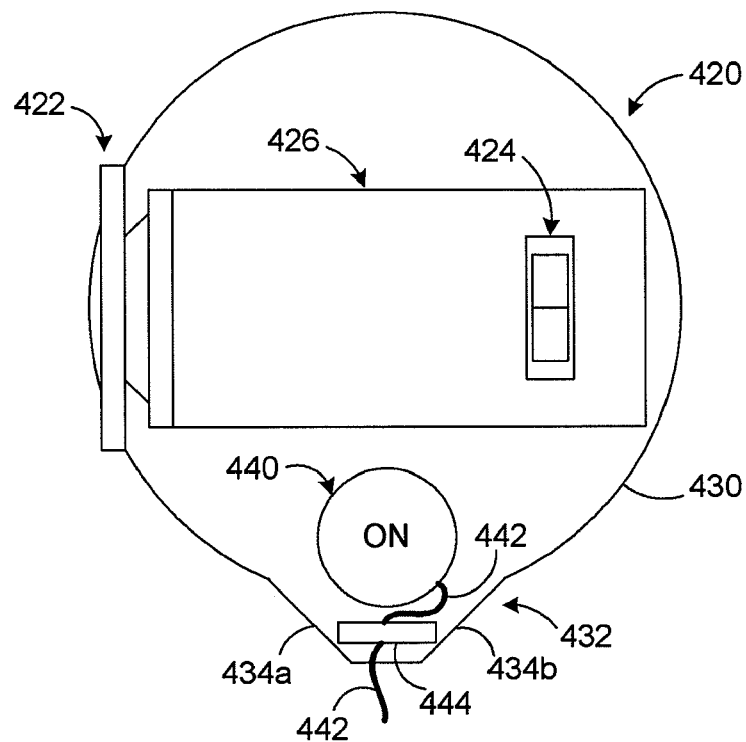
FIGS. 26A and 26B show that in one embodiment, the support member can include a storage nest indexing member that allows for accurate positioning of the support member when stored, and/or a stability member that provides additional stability when the support member is in its deployed configuration.
Figure 26B:
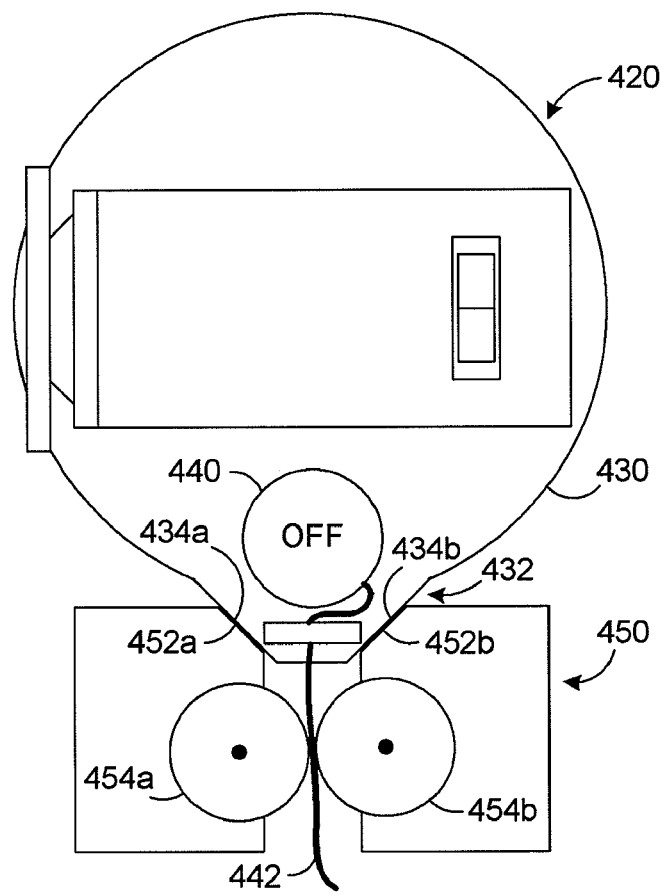

FIGS. 26A and 26B show by examples that in some embodiments, support members can be configured in other ways to provide different functionalities that can be desirable. For example, a support member can be configured to provide additional stability when at its support location. In another example, a support member can be configured to facilitate its easy return to its nesting position from the support location.

FIG. 26A shows a top view of one embodiment of a support member 420 having a housing with a retractable member (tape, for example) therein. The support member 420 is further shown to have first and second cross bars 422 and 424. The first cross bar 422 engages with the articulator to facilitate movement of the support member 420 as a whole. The second cross bar 424 is coupled to the retractable member and engages with the articulator to facilitate up and/or down movement of the object engaging member (V-nest, for example). The support member 420 is further shown to include a base 430 that provides stability of the support member 420.

In one embodiment, the support member can include a stability enhancing member 440, and a return facilitating member 432. In one embodiment, the stability enhancing member 440 includes an electromagnet 440 that is powered via a power cord 442. The power cord 442 can be secured via a bulkhead 444 so as to relieve stress on the cord coupling at the electromagnet 440.

As shown in FIG. 26A, the electromagnet 440 is shown to be turned "ON," when the support member 420 is in its support location, thereby providing additional downward force against a metallic table top. Thus, when the electromagnet 440 is energized, the stability of the support member can be enhanced. In one embodiment, the electromagnet can be powered at or about the support member 420 (via the articulator, for example), or from the power source (not shown) either manually or under the control of the controller.

For the purpose of description of FIGS. 26A and 26B, it will be assumed that the metallic table top has at least some magnetic material. Of course, not all table tops or other support surfaces are magnetic. Other stability-enhancing techniques—such as bases having suction capability—are contemplated.

When the supporting function of the support member 420 is completed, the electromagnet can be turned off, thereby allowing the support member 420 to be moved back to its nesting location easier. In one embodiment, the support member 420 can be pulled back into the nesting location by retraction of the power cord (or some other cord) 422.

FIG. 26B shows that in one embodiment, a nesting assembly 450 can be configured to provide such retraction of the cord 442. For example pinch rollers 454a and 454b can engage the cord 442 and rotate (clockwise for the roller 454a, and counterclockwise for the roller 454b), thereby pulling the support member 420 into the nesting assembly 450. When the support member 420 is to be deployed from the nesting assembly 450, the pinch rollers 454a and 454b can disengage from the cord 442, thereby allowing the cord 442 to move with the support member 420.

In one embodiment, as shown in FIGS. 26A and 26B, the support member 420 and the nesting assembly 450 can be configured to facilitate repeatable and accurate positioning of the support member 420 at the nesting assembly 450. In one embodiment, the base 430 can be dimensioned to define the return facilitating member 432. In one embodiment, the return facilitating member 432 can define tapers 434a and 434b. The nesting assembly 450 can also be dimensioned to define taper receiving surfaces 452a and 452b. Thus, when the taper 434 of the base 430 is pulled into the space defined by the taper receiving surfaces 452a and 452b, mating of the tapers to their respective receiving surfaces (taper 434a to surface 452a, and taper 434b to surface 452b) facilitates accurate positioning of the support member 420 at the nesting assembly 450. It will be understood that other configurations are possible.

FIGS. 27-31 show how some features of the present disclosure can be configured to accommodate situations where the actual object deviates significantly from the definition data. FIG. 27A shows an example situation 470 where an actual object 472 can deviate significantly from the definition data (depicted as 210). The articulator is shown to be performing measurements at example locations 476a, 476b, and 476c. For the purpose of description, the articulator is depicted as having example prongs 478a and 478b that move about the object 470 according to the definition data 210.

The example situation 470 shows that in one embodiment, the example support locations 186a, 186b, and 186c (based on the definition data 210) can be adjusted to new support locations (depicted as 474a, 474b, and 474c) to accommodate the deviation of the object 472 from the definition data 210. In some situations, the articulator may be able to handle deviations to some degree without having to adjust the support locations. FIG. 27A shows a concept where one or more of the support locations can be adjusted from those defined by the definition data to account for some deviation of the object so as to facilitate measurement of the object.

FIG. 27B shows an example situation 480 where the deviation of an object 482 can be substantial such that support location adjustments alone may not be enough to allow proper measurements. Even if support locations can be adjusted, it may be desirable to make other adjustments to accommodate the substantial deviation of the object 480.

FIG. 27B further shows examples of how the deviation of the object 482 (from the definition data 210) can lead to problems in measurement movements based on the definition data 210. An example measurement 484a, where the articulator prongs 478a and 478b are able to accommodate the first section of the object 482, is not problematic, since the first section of the object 482 is depicted as being generally aligned with the corresponding section of the definition data 210.

However, in another example measurement 484b where the prongs 478 are depicted as being centered with respect to the second section of the definition data 210, the second section of the object 482 is depicted as being deviated sufficiently so that one of the prongs 478b can touch the object 482. If the prongs 478 attempt to move based on the definition data 210 (for example, from left to right in FIG. 27B), then the second section of the object 482 will inhibit further movement. Such a situation can result in damages to the articulator, the object 482, or both.

In another example measurement 484c where the prongs 478 are depicted as being centered with respect to the last section of the definition data 210, the last section of the object 482 is depicted as being deviated even further (than the example second section) so that the prongs 478 miss that section altogether.

Based on the description of FIGS. 27A and 27B, one can see that a capability to handle deviations of objects from their definition data can be useful and desirable. While the example objects 470 and 480 in FIGS. 27A and 27B were rod-like objects, it will be understood that the concept of adjusting to accommodate for deviation can be applied to any other shaped objects that can be measured by the articulator.

FIG. 28 shows one embodiment of a process 490 that can provide the foregoing functionality of adjusting to accommodate deviations in objects. In a process block 492, deviation of an object from the definition data is detected. Such detection can be achieved in a number of ways. For example, the deviation may be sufficiently apparent to an operator. In another example, the articulator can be configured to sense contact with some object. If such contact is unexpected, the nature of the contact can be verified, for example, by the operator. In a process block 494, corrective action is performed to account for the deviation.

FIG. 29 shows one embodiment of a process 500 that can perform the corrective action of the process 490 of FIG. 28. In a process block 502, deviation is detected. In a process block 504, adjustments to support locations can be determined to accommodate the deviation. In a process block 506, adjustments of the support locations can be facilitated. In one embodiment, the support members can be adjusted to provide such adjustments of the support locations. In one embodiment, adjustment(s) of the support location(s) can be performed by the operator, automatically by the articulator under the control of the controller, or any combination thereof.

Figure 30:
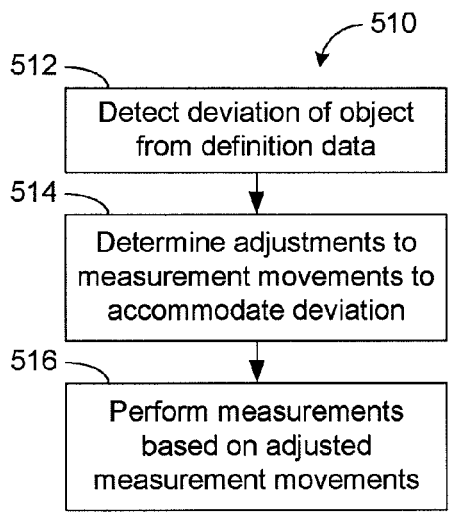
FIG. 30 shows one embodiment of a process that can adjust measurement movements to accommodate the example situation of FIG. 27B.

FIG. 30 shows one embodiment of a process 510 that can perform the corrective action of the process 490 of FIG. 28. In a process block 512, deviation is detected. In a process block 514, adjustments to measurement movements of the articulator are determined to accommodate the deviation. In a process block 516, measurement movements are effectuated based on the adjusted measurement movement data or instruction.

Figure 31:
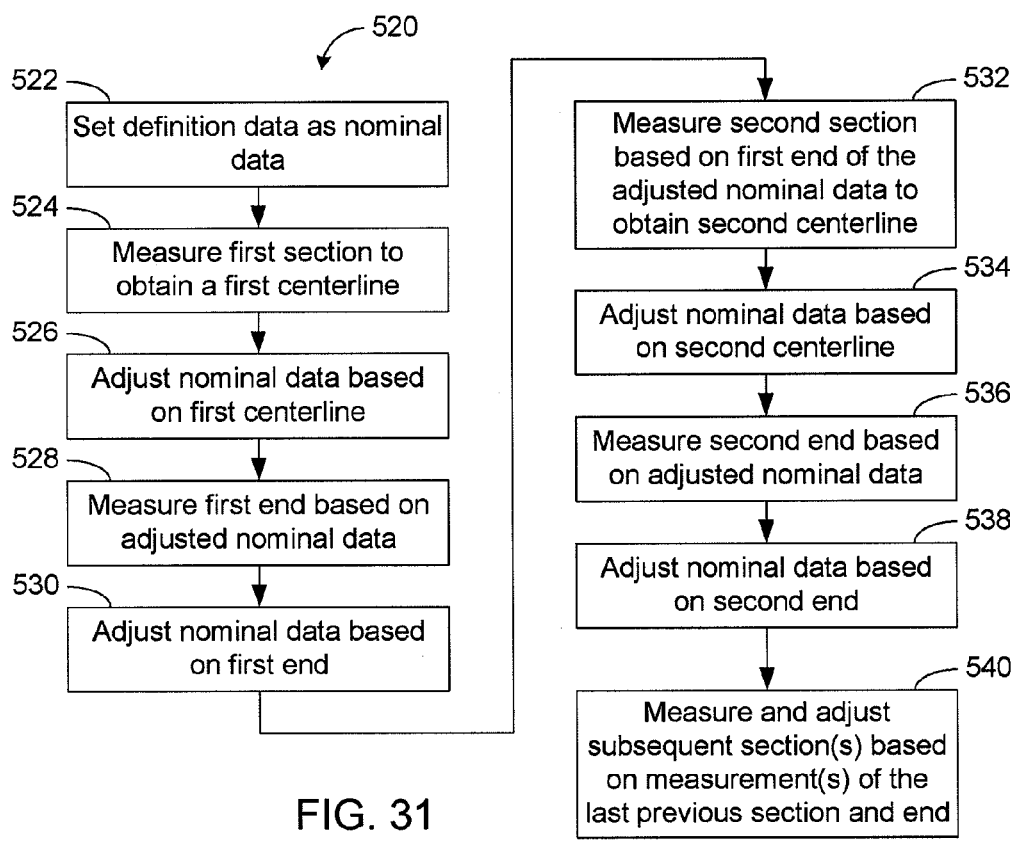
FIG. 31 shows one embodiment of an example of the process of FIG. 30.

FIG. 31 shows one embodiment of a process 520 that can be an example of the process 510 of FIG. 30. In this example, one of the sections is positioned so as to be measurable according to movement data that is based on the definition data. Thus, the example situation shown in FIG. 27B can apply to the example process 520. Measurement movements for the second section are adjusted based on the measurement of the first section, and so on. For the purpose of description of FIG. 31, "nominal data" refers to the measurement movement data or instruction that can be adjusted.

In a process block 522, measurement movement data based on the definition data is set as the nominal data. In a process block 524, the first section is measured to obtain first centerline information. In a process block 526, the nominal data is adjusted so as to conform to the first centerline. In a process block 528, the first end (intersection point between the first and second sections) is determined based on the adjusted nominal data. In a process block 530, the nominal data is adjusted based on the first end determination. In on embodiment, the nominal data is adjusted so that the unadjusted first end information (along with the remaining data for subsequent sections and ends) undergo a 3D transformation so as to yield adjusted first end information that coincides with the first end determined in the process block 528. In a process block 532, the second section is measured based on the first end of the adjusted nominal data to obtain second centerline information. In a process block 534, the nominal data is adjusted so as to conform to the second centerline. In a process block 536, the second end (intersection point between the second and third sections) is determined based on the adjusted nominal data. In a process block 538, the nominal data is adjusted based on the second end determination. As shown in a process block 540, measurements of subsequent sections and adjustments can be performed in a similar manner.

Listing of Example Data

Sample data for an example process 290 illustrated in FIG. 20 and described above are displayed below. In the example data listed, each movement instruction for articulator movement has 19 entries as follows:

1-3: X, Y, Z
4-6: cosines projections on X-axis
7-9: cosines of projections on Y-axis
10-12: cosines of projections on Z-axis
13: elbow offset
14-16: uvw offset
17: speed (mm/s)
18: pre-process dwell time (ms)
19: control code

STEP: 1
ROBO REFERENCE: ~1977

| | | | | | | | | | | | |
|---|---|---|---|---|---|---|---|---|---|---|---|
| +877.094 | +186.137 | +272.799 | +0.707104 | +0.000076 | +0.707109 | −0.028273 | +0.999203 | +0.028165 | −0.706544 | −0.039908 | +0.706543 |
| +0.000 | +0.000 | +0.000 | +0.000 | 150.00 | 0.00 | 0 | | | | | |
| +938.612 | +187.491 | +93.426 | +0.258782 | +0.016631 | +0.965792 | −0.004305 | +0.999862 | −0.016065 | −0.965926 | −0.000001 | +0.258818 |
| +0.000 | +0.000 | +0.000 | +0.000 | 150.00 | 0.00 | 0 | | | | | |
| +962.585 | +187.498 | +117.352 | +0.069752 | +0.011107 | +0.997503 | −0.000775 | +0.999938 | −0.011080 | −0.997564 | −0.000000 | +0.069756 |
| +0.000 | +0.000 | +0.000 | +0.000 | 75.00 | 0.00 | 0 | | | | | |
| +994.992 | +187.560 | +114.978 | +0.034900 | +0.000230 | +0.999391 | −0.000008 | +1.000000 | −0.000230 | −0.999391 | +0.000000 | +0.034900 |
| +0.000 | +0.000 | +0.000 | +0.000 | 75.00 | 0.00 | 0 | | | | | |
| +1024.995 | +187.535 | +114.969 | −0.000001 | −0.009372 | +0.999956 | +0.000000 | +0.999956 | +0.009372 | −1.000000 | +0.000000 | −0.000001 |
| +0.000 | +0.000 | +0.000 | +0.000 | 75.00 | 0.00 | 0 | | | | | |
| +1031.836 | +187.506 | +172.328 | −0.000001 | −0.017445 | +0.999848 | +0.000000 | +0.999848 | +0.017445 | −1.000000 | +0.000000 | −0.000001 |
| +0.000 | +0.000 | +0.000 | +0.000 | 75.00 | 1.00 | 0 | | | | | |
| +1024.922 | +187.493 | +160.191 | +0.069749 | −0.015740 | +0.997440 | +0.001097 | +0.999876 | +0.015702 | −0.997564 | −0.000001 | +0.069757 |
| +0.000 | +0.000 | +0.000 | +0.000 | 75.00 | 1.00 | 0 | | | | | |
| +1024.927 | +187.502 | +155.284 | +0.069748 | −0.015169 | +0.997449 | +0.001058 | +0.999885 | +0.015132 | −0.997564 | +0.000000 | +0.069756 |
| +0.000 | +0.000 | +0.000 | +0.000 | 75.00 | 0.00 | 0 | | | | | |
| +995.017 | +187.447 | +157.516 | +0.069757 | −0.005408 | +0.997549 | +0.000376 | +0.999985 | +0.005395 | −0.997564 | −0.000001 | +0.069758 |
| +0.000 | +0.000 | +0.000 | +0.000 | 75.00 | 0.00 | 0 | | | | | |
| +962.586 | +187.478 | +159.704 | +0.069755 | +0.005975 | +0.997546 | −0.000417 | +0.999982 | −0.005960 | −0.997564 | −0.000000 | +0.069756 |
| +0.000 | +0.000 | +0.000 | +0.000 | 75.00 | 0.00 | 0 | | | | | |
| +874.837 | +185.706 | +167.450 | +1.000000 | −0.000003 | −0.000001 | +0.000003 | +0.998489 | +0.054951 | +0.000001 | −0.054951 | +0.998489 |
| +0.000 | +0.000 | +0.000 | +0.000 | 75.00 | 0.00 | 0 | | | | | |
| +887.679 | +186.028 | +106.887 | +0.998630 | +0.000001 | +0.052336 | −0.002388 | +0.998959 | +0.045546 | −0.052282 | −0.045608 | +0.997590 |
| +0.000 | +0.000 | +0.000 | +0.000 | 75.00 | 0.00 | 0 | | | | | |
| +898.355 | +185.923 | +102.429 | +0.999391 | −0.000002 | +0.034899 | −0.001684 | +0.998832 | +0.048284 | −0.034858 | −0.048313 | +0.998224 |
| +0.000 | +0.000 | +0.000 | +0.000 | 75.00 | 0.00 | 0 | | | | | |
| +903.543 | +186.331 | +84.413 | +0.999848 | −0.000001 | +0.017452 | −0.000841 | +0.998837 | +0.048209 | −0.017432 | −0.048216 | +0.998685 |
| +0.000 | +0.000 | +0.000 | +0.000 | 75.00 | 0.00 | 0 | | | | | |
| +907.712 | +186.721 | +76.369 | +0.999848 | −0.000000 | +0.017452 | −0.000842 | +0.998835 | +0.048257 | −0.017432 | −0.048265 | +0.998682 |
| +0.000 | +0.000 | +0.000 | +0.000 | 75.00 | 0.00 | 0 | | | | | |
| +911.962 | +187.102 | +68.116 | +1.000000 | −0.000001 | −0.000000 | +0.000001 | +0.998781 | +0.049367 | +0.000000 | −0.049367 | +0.998781 |
| +0.000 | +0.000 | +0.000 | +0.000 | 75.00 | 0.00 | 0 | | | | | |
| +800.099 | +187.496 | +59.999 | +1.000000 | +0.000000 | +0.000000 | −0.000000 | +0.999808 | +0.019604 | −0.000000 | −0.019604 | +0.999808 |
| +0.000 | +0.000 | +0.000 | +0.000 | 75.00 | 0.00 | 64 | | | | | |
| +744.853 | +199.045 | +56.611 | −0.778366 | +0.627811 | +0.000000 | −0.627340 | −0.777782 | −0.038719 | −0.024308 | −0.030138 | +0.999250 |
| +0.000 | +0.000 | +0.000 | +0.000 | 75.00 | 0.00 | 64 | | | | | |
| +725.539 | +214.642 | +59.274 | −0.778366 | +0.627811 | −0.000000 | −0.627627 | −0.778139 | −0.024177 | −0.015178 | −0.018818 | +0.999708 |
| +0.000 | +0.000 | +0.000 | +0.000 | 75.00 | 0.00 | 64 | | | | | |
| +725.344 | +214.482 | +67.396 | −0.778366 | +0.627811 | +0.000000 | −0.627552 | −0.778046 | −0.028685 | −0.018008 | −0.022327 | +0.999589 |
| +0.000 | +0.000 | +0.000 | +0.000 | 75.00 | 1.00 | 64 | | | | | |
| +725.202 | +214.261 | +75.511 | −0.778366 | +0.627810 | +0.000000 | −0.627461 | −0.777933 | −0.033341 | −0.020932 | −0.025951 | +0.999444 |
| +0.000 | +0.000 | +0.000 | +0.000 | 75.00 | 0.00 | 64 | | | | | |
| +724.967 | +213.967 | +83.627 | −0.778366 | +0.627810 | +0.000000 | −0.627357 | −0.777805 | −0.037982 | −0.023845 | −0.029564 | +0.999278 |
| +0.000 | +0.000 | +0.000 | +0.000 | 75.00 | 0.00 | 64 | | | | | |
| +724.686 | +213.614 | +91.740 | −0.778366 | +0.627810 | +0.000000 | −0.627239 | −0.777658 | −0.042664 | −0.026785 | −0.033208 | +0.999089 |
| +0.000 | +0.000 | +0.000 | +0.000 | 75.00 | 0.00 | 64 | | | | | |
| +724.468 | +213.335 | +106.729 | −0.778366 | +0.627811 | +0.000000 | −0.626958 | −0.777310 | −0.052086 | −0.032700 | −0.040542 | +0.998643 |
| +0.000 | +0.000 | +0.000 | +0.000 | 75.00 | 0.00 | 64 | | | | | |
| +722.175 | +215.236 | +117.151 | −0.777323 | +0.626969 | −0.051751 | −0.624956 | −0.779012 | −0.050702 | −0.072103 | −0.007070 | +0.997372 |
| +0.000 | +0.000 | +0.000 | +0.000 | 75.00 | 0.00 | 64 | | | | | |

-continued

| | | | | | | | | | | | |
|---|---|---|---|---|---|---|---|---|---|---|---|
| +715.917 | +216.812 | +229.744 | −0.777324 | +0.626969 | −0.051750 | −0.616826 | −0.775744 | −0.133216 | −0.123667 | −0.071631 | +0.989735 |
| +0.000 | +0.000 | +0.000 | +0.000 | 150.00 | 0.00 | 64 | | | | | |
| +899.859 | +184.880 | +282.187 | +1.000000 | −0.000004 | −0.000002 | +0.000004 | +0.996764 | +0.080387 | +0.000002 | −0.080387 | +0.996764 |
| +0.000 | +0.000 | +0.000 | +0.000 | 150.00 | 0.00 | 64 | | | | | |

STEP: 2
ROBO REFERENCE: ~1977

| | | | | | | | | | | | |
|---|---|---|---|---|---|---|---|---|---|---|---|
| +877.090 | −185.632 | +272.783 | +0.707102 | −0.000103 | +0.707111 | +0.038913 | +0.998490 | −0.038767 | −0.706040 | +0.054929 | +0.706039 |
| +0.000 | +0.000 | +0.000 | +0.000 | 150.00 | 0.00 | 0 | | | | | |
| +938.658 | −187.454 | +93.622 | +0.258785 | −0.015347 | +0.965813 | +0.003977 | +0.999882 | +0.014823 | −0.965927 | +0.000005 | +0.258816 |
| +0.000 | +0.000 | +0.000 | +0.000 | 150.00 | 0.00 | 0 | | | | | |
| +962.584 | −187.495 | +117.339 | +0.069754 | −0.008421 | +0.997529 | +0.000587 | +0.999965 | +0.008401 | −0.997564 | +0.000000 | +0.069756 |
| +0.000 | +0.000 | +0.000 | +0.000 | 75.00 | 0.00 | 0 | | | | | |
| +995.010 | −187.568 | +115.039 | +0.034898 | +0.005369 | +0.999376 | −0.000188 | +0.999986 | −0.005366 | −0.999391 | −0.000000 | +0.034898 |
| +0.000 | +0.000 | +0.000 | +0.000 | 75.00 | 0.00 | 0 | | | | | |
| +1025.006 | −187.538 | +115.050 | −0.000003 | +0.017548 | +0.999846 | −0.000000 | +0.999846 | −0.017548 | −1.000000 | −0.000000 | −0.000003 |
| +0.000 | +0.000 | +0.000 | +0.000 | 75.00 | 0.00 | 0 | | | | | |
| +1033.021 | −187.510 | +184.134 | −0.000002 | +0.030279 | +0.999541 | −0.000000 | +0.999541 | −0.030279 | −1.000000 | −0.000000 | −0.000002 |
| +0.000 | +0.000 | +0.000 | +0.000 | 75.00 | 1.00 | 0 | | | | | |
| +1024.916 | +187.490 | +171.982 | +0.069732 | +0.027806 | +0.997178 | −0.001938 | +0.999613 | −0.027739 | −0.997564 | +0.000001 | +0.069759 |
| +0.000 | +0.000 | +0.000 | +0.000 | 75.00 | 1.00 | 0 | | | | | |
| +1024.930 | −187.501 | +167.141 | +0.069731 | +0.027036 | +0.997199 | −0.001886 | +0.999634 | −0.026970 | −0.997564 | −0.000000 | +0.069756 |
| +0.000 | +0.000 | +0.000 | +0.000 | 75.00 | 0.00 | 0 | | | | | |
| +995.002 | −187.453 | +169.306 | +0.069753 | +0.014648 | +0.997457 | −0.001020 | +0.999893 | −0.014612 | −0.997564 | +0.000002 | +0.069760 |
| +0.000 | +0.000 | +0.000 | +0.000 | 75.00 | 0.00 | 0 | | | | | |
| +962.583 | −187.394 | +171.680 | +0.069757 | +0.000340 | +0.997564 | −0.000023 | +1.000000 | −0.000339 | −0.997564 | +0.000001 | +0.069757 |
| +0.000 | +0.000 | +0.000 | +0.000 | 75.00 | 0.00 | 0 | | | | | |
| +874.853 | −185.028 | +167.407 | +1.000000 | +0.000003 | −0.000002 | −0.000003 | +0.997134 | −0.075651 | +0.000001 | +0.075651 | +0.997134 |
| +0.000 | +0.000 | +0.000 | +0.000 | 75.00 | 0.00 | 0 | | | | | |
| +887.581 | −185.435 | +106.849 | +0.998629 | −0.000001 | +0.052337 | +0.003315 | +0.997994 | −0.063228 | −0.052232 | +0.063315 | +0.996626 |
| +0.000 | +0.000 | +0.000 | +0.000 | 75.00 | 0.00 | 0 | | | | | |
| +898.414 | −185.327 | +102.398 | +0.999391 | +0.000002 | +0.034898 | +0.002331 | +0.997762 | −0.066820 | −0.034820 | +0.066860 | +0.997155 |
| +0.000 | +0.000 | +0.000 | +0.000 | 75.00 | 0.00 | 0 | | | | | |
| +903.482 | −185.863 | +84.386 | +0.999848 | +0.000001 | +0.017452 | +0.001164 | +0.997771 | −0.066719 | −0.017413 | +0.066729 | +0.997619 |
| +0.000 | +0.000 | +0.000 | +0.000 | 75.00 | 0.00 | 0 | | | | | |
| +907.645 | −186.407 | +76.350 | +0.999848 | +0.000000 | +0.017452 | +0.001165 | +0.997766 | −0.066797 | −0.017413 | +0.066807 | +0.997614 |
| +0.000 | +0.000 | +0.000 | +0.000 | 75.00 | 0.00 | 0 | | | | | |
| +911.913 | −186.937 | +68.106 | +1.000000 | +0.000001 | −0.000001 | −0.000001 | +0.997665 | −0.068299 | +0.000001 | +0.068299 | +0.997665 |
| +0.000 | +0.000 | +0.000 | +0.000 | 75.00 | 0.00 | 0 | | | | | |
| +800.117 | −187.510 | +59.999 | +1.000000 | −0.000001 | +0.000000 | +0.000001 | +0.999535 | −0.030503 | −0.000000 | +0.030503 | +0.999535 |
| +0.000 | +0.000 | +0.000 | +0.000 | 75.00 | 0.00 | 64 | | | | | |
| +678.580 | −342.769 | +51.499 | +0.186658 | +0.982425 | +0.000000 | −0.981966 | +0.186571 | −0.030548 | −0.030011 | +0.005702 | +0.999533 |
| +0.000 | +0.000 | +0.000 | +0.000 | 75.00 | 0.00 | 64 | | | | | |
| +683.090 | −319.050 | +57.938 | +0.186658 | +0.982425 | +0.000000 | −0.982072 | +0.186591 | −0.026787 | −0.026316 | +0.005000 | +0.999641 |
| +0.000 | +0.000 | +0.000 | +0.000 | 75.00 | 0.00 | 64 | | | | | |
| +682.824 | −318.990 | +66.060 | +0.186658 | +0.982425 | +0.000000 | −0.981933 | +0.186564 | −0.031649 | −0.031092 | +0.005907 | +0.999499 |
| +0.000 | +0.000 | +0.000 | +0.000 | 75.00 | 1.00 | 64 | | | | | |
| +682.558 | −318.957 | +74.172 | +0.186658 | +0.982425 | +0.000000 | −0.981765 | +0.186532 | −0.036649 | −0.036005 | +0.006841 | +0.999328 |
| +0.000 | +0.000 | +0.000 | +0.000 | 75.00 | 0.00 | 64 | | | | | |
| +682.158 | −318.883 | +82.286 | +0.186658 | +0.982425 | +0.000000 | −0.981574 | +0.186496 | −0.041605 | −0.040874 | +0.007766 | +0.999134 |
| +0.000 | +0.000 | +0.000 | +0.000 | 75.00 | 0.00 | 64 | | | | | |
| +681.615 | −318.765 | +90.401 | +0.186658 | +0.982425 | +0.000000 | −0.981362 | +0.186456 | −0.046504 | −0.045687 | +0.008680 | +0.998918 |
| +0.000 | +0.000 | +0.000 | +0.000 | 75.00 | 0.00 | 64 | | | | | |
| +681.283 | −318.700 | +105.384 | +0.186657 | +0.982425 | +0.000000 | −0.980842 | +0.186356 | −0.056755 | −0.055757 | +0.010594 | +0.998388 |
| +0.000 | +0.000 | +0.000 | +0.000 | 75.00 | 0.00 | 64 | | | | | |
| +681.697 | −315.823 | +116.060 | +0.186426 | +0.981201 | −0.049903 | −0.981182 | +0.183342 | −0.060554 | −0.050267 | +0.060253 | +0.996917 |
| +0.000 | +0.000 | +0.000 | +0.000 | 75.00 | 0.00 | 64 | | | | | |
| +679.607 | −309.073 | +241.379 | +0.186425 | +0.981201 | −0.049903 | −0.970604 | +0.176065 | −0.164100 | −0.152228 | +0.079029 | +0.985181 |
| +0.000 | +0.000 | +0.000 | +0.000 | 150.00 | 0.00 | 64 | | | | | |
| +899.909 | −183.955 | +282.101 | +1.000000 | +0.000002 | −0.000002 | −0.000003 | +0.994064 | −0.108800 | +0.000002 | +0.108800 | +0.994064 |
| +0.000 | +0.000 | +0.000 | +0.000 | 150.00 | 0.00 | 64 | | | | | |

STEP: 3
ROBO REFERENCE: ~1977

| | | | | | | | | | | | |
|---|---|---|---|---|---|---|---|---|---|---|---|
| +877.079 | +62.219 | +272.829 | +0.707107 | +0.000009 | +0.707107 | −0.005450 | +0.999970 | +0.005438 | −0.707086 | −0.007699 | +0.707086 |
| +0.000 | +0.000 | +0.000 | +0.000 | 150.00 | 0.00 | 0 | | | | | |
| +938.620 | +62.498 | +93.457 | +0.258815 | +0.005354 | +0.965912 | −0.001386 | +0.999986 | −0.005171 | −0.965926 | −0.000000 | +0.258819 |
| +0.000 | +0.000 | +0.000 | +0.000 | 150.00 | 0.00 | 0 | | | | | |
| +962.589 | +62.499 | +117.101 | +0.069756 | +0.003994 | +0.997556 | −0.000279 | +0.999992 | −0.003984 | −0.997564 | −0.000000 | +0.069756 |
| +0.000 | +0.000 | +0.000 | +0.000 | 75.00 | 0.00 | 0 | | | | | |
| +994.999 | +62.500 | +114.965 | +0.034900 | +0.001353 | +0.999390 | −0.000047 | +0.999999 | −0.001353 | −0.999391 | +0.000000 | +0.034900 |
| +0.000 | +0.000 | +0.000 | +0.000 | 75.00 | 0.00 | 0 | | | | | |
| +1025.000 | +62.500 | +115.025 | −0.000000 | −0.000962 | +1.000000 | +0.000000 | +1.000000 | +0.000962 | −1.000000 | +0.000000 | −0.000000 |
| +0.000 | +0.000 | +0.000 | +0.000 | 75.00 | 0.00 | 0 | | | | | |
| +1035.244 | +62.503 | +206.307 | −0.000000 | −0.004086 | +0.999992 | +0.000000 | +0.999992 | +0.004086 | −1.000000 | +0.000000 | −0.000000 |
| +0.000 | +0.000 | +0.000 | +0.000 | 75.00 | 1.00 | 0 | | | | | |
| +1024.918 | +62.497 | +194.206 | +0.069756 | −0.003445 | +0.997558 | +0.000240 | +0.999994 | +0.003437 | −0.997564 | −0.000000 | +0.069757 |
| +0.000 | +0.000 | +0.000 | +0.000 | 75.00 | 1.00 | 0 | | | | | |

-continued

| | | | | | | | | | | | |
|---|---|---|---|---|---|---|---|---|---|---|---|
| +1024.933 | +62.500 | +189.431 | +0.069756 | −0.003298 | +0.997559 | +0.000230 | +0.999995 | +0.003290 | −0.997564 | +0.000000 | +0.069756 |
| +0.000 | +0.000 | +0.000 | +0.000 | 75.00 | 0.00 | 0 | | | | | |
| +995.002 | +62.500 | +191.465 | +0.069756 | −0.001013 | +0.997564 | +0.000071 | +0.999999 | +0.001011 | −0.997564 | −0.000000 | +0.069756 |
| +0.000 | +0.000 | +0.000 | +0.000 | 75.00 | 0.00 | 0 | | | | | |
| +962.585 | +62.495 | +193.779 | +0.069756 | +0.001662 | +0.997563 | −0.000116 | +0.999999 | −0.001658 | −0.997564 | −0.000000 | +0.069756 |
| +0.000 | +0.000 | +0.000 | +0.000 | 75.00 | 0.00 | 0 | | | | | |
| +874.866 | +62.113 | +167.498 | +1.000000 | −0.000001 | −0.000000 | +0.000001 | +0.999929 | +0.011932 | +0.000000 | −0.011932 | +0.999929 |
| +0.000 | +0.000 | +0.000 | +0.000 | 75.00 | 0.00 | 0 | | | | | |
| +887.633 | +62.184 | +106.916 | +0.998630 | +0.000000 | +0.052336 | −0.000510 | +0.999953 | +0.009718 | −0.052334 | −0.009731 | +0.998582 |
| +0.000 | +0.000 | +0.000 | +0.000 | 75.00 | 0.00 | 0 | | | | | |
| +898.389 | +62.164 | +102.468 | +0.999391 | −0.000000 | +0.034899 | −0.000362 | +0.999946 | +0.010371 | −0.034898 | −0.010377 | +0.999337 |
| +0.000 | +0.000 | +0.000 | +0.000 | 75.00 | 0.00 | 0 | | | | | |
| +903.524 | +62.248 | +84.439 | +0.999848 | −0.000000 | +0.017452 | −0.000180 | +0.999947 | +0.010338 | −0.017451 | −0.010340 | +0.999794 |
| +0.000 | +0.000 | +0.000 | +0.000 | 75.00 | 0.00 | 0 | | | | | |
| +907.670 | +62.318 | +76.384 | +0.999848 | −0.000000 | +0.017452 | −0.000180 | +0.999947 | +0.010338 | −0.017451 | −0.010339 | +0.999794 |
| +0.000 | +0.000 | +0.000 | +0.000 | 75.00 | 0.00 | 0 | | | | | |
| +911.912 | +62.409 | +68.124 | +1.000000 | −0.000000 | −0.000000 | +0.000000 | +0.999944 | +0.010590 | +0.000000 | −0.010590 | +0.999944 |
| +0.000 | +0.000 | +0.000 | +0.000 | 75.00 | 0.00 | 0 | | | | | |
| +800.118 | +62.499 | +60.000 | +1.000000 | +0.000000 | +0.000000 | −0.000000 | +0.999994 | +0.003425 | −0.000000 | −0.003425 | +0.999994 |
| +0.000 | +0.000 | +0.000 | +0.000 | 75.00 | 0.00 | 64 | | | | | |
| +615.637 | −107.686 | +63.109 | +0.269462 | +0.963011 | +0.000000 | −0.952962 | +0.266650 | +0.144084 | +0.138754 | −0.038825 | +0.989566 |
| +0.000 | +0.000 | +0.000 | +0.000 | 75.00 | 0.00 | 64 | | | | | |
| +622.358 | −83.675 | +60.911 | +0.269468 | +0.963009 | −0.000000 | −0.953344 | +0.266764 | +0.141322 | +0.136095 | −0.038082 | +0.989964 |
| +0.000 | +0.000 | +0.000 | +0.000 | 75.00 | 0.00 | 64 | | | | | |
| +623.465 | −83.975 | +68.947 | +0.269468 | +0.963009 | +0.000000 | −0.954319 | +0.267036 | +0.134038 | +0.129079 | −0.036119 | +0.990976 |
| +0.000 | +0.000 | +0.000 | +0.000 | 75.00 | 1.00 | 64 | | | | | |
| +624.406 | −84.238 | +77.013 | +0.269468 | +0.963009 | +0.000000 | −0.955235 | +0.267292 | +0.126811 | +0.122120 | −0.034171 | +0.991927 |
| +0.000 | +0.000 | +0.000 | +0.000 | 75.00 | 0.00 | 64 | | | | | |
| +625.235 | −84.469 | +85.093 | +0.269467 | +0.963010 | +0.000000 | −0.956100 | +0.267534 | +0.119575 | +0.115152 | −0.032221 | +0.992825 |
| +0.000 | +0.000 | +0.000 | +0.000 | 75.00 | 0.00 | 64 | | | | | |
| +625.952 | −84.668 | +93.186 | +0.269467 | +0.963010 | +0.000000 | −0.956915 | +0.267762 | +0.112328 | +0.108173 | −0.030269 | +0.993671 |
| +0.000 | +0.000 | +0.000 | +0.000 | 75.00 | 0.00 | 64 | | | | | |
| +625.591 | −84.559 | +108.227 | +0.269468 | +0.963009 | +0.000000 | −0.958100 | +0.268094 | +0.100850 | +0.097119 | −0.027176 | +0.994902 |
| +0.000 | +0.000 | +0.000 | +0.000 | 75.00 | 0.00 | 64 | | | | | |
| +626.057 | −81.584 | +118.603 | +0.269095 | +0.961689 | −0.052375 | −0.957809 | +0.272916 | +0.090099 | +0.100942 | +0.025919 | +0.994555 |
| +0.000 | +0.000 | +0.000 | +0.000 | 75.00 | 0.00 | 64 | | | | | |
| +623.560 | −72.963 | +264.254 | +0.269096 | +0.961688 | −0.052375 | −0.962312 | +0.266257 | −0.055338 | −0.039273 | +0.065292 | +0.997093 |
| +0.000 | +0.000 | +0.000 | +0.000 | 150.00 | 0.00 | 64 | | | | | |
| +699.911 | +61.918 | +282.289 | +1.000000 | −0.000001 | −0.000000 | +0.000001 | +0.999839 | +0.017930 | +0.000000 | −0.017930 | +0.999839 |
| +0.000 | +0.000 | +0.000 | +0.000 | 150.00 | 0.00 | 64 | | | | | |

STEP: 5
ROBO REFERENCE: ~1977

| | | | | | | | | | | | |
|---|---|---|---|---|---|---|---|---|---|---|---|
| +611.659 | −315.901 | +271.860 | +0.703125 | +0.711066 | +0.000000 | −0.704924 | +0.697052 | −0.131152 | −0.093258 | +0.092216 | +0.991362 |
| +0.000 | +0.000 | +0.000 | +0.000 | 300.00 | 0.00 | 0 | | | | | |
| +612.763 | −316.994 | +225.678 | +0.703125 | +0.711066 | +0.000000 | −0.708574 | +0.700661 | −0.083642 | −0.059475 | +0.058811 | +0.996496 |
| +0.000 | +0.000 | +0.000 | +0.000 | 75.00 | 0.00 | 1 | | | | | |
| +614.676 | −318.897 | +193.295 | +0.703125 | +0.711066 | +0.000000 | −0.709996 | +0.702067 | −0.054831 | −0.038989 | +0.038553 | +0.998496 |
| +0.000 | +0.000 | +0.000 | +0.000 | 75.00 | 0.00 | 0 | | | | | |
| +615.480 | −319.658 | +169.655 | +0.703125 | +0.711066 | −0.000000 | −0.710649 | +0.702713 | −0.034248 | −0.024353 | +0.024081 | +0.999413 |
| +0.000 | +0.000 | +0.000 | +0.000 | 75.00 | 0.00 | 0 | | | | | |
| +614.675 | −318.897 | +193.295 | +0.703125 | +0.711066 | −0.000000 | −0.709996 | +0.702067 | −0.054831 | −0.038988 | +0.038553 | +0.998496 |
| +0.000 | +0.000 | +0.000 | +0.000 | 75.00 | 1.00 | 0 | | | | | |
| +612.760 | −316.997 | +225.678 | +0.703125 | +0.711066 | −0.000000 | −0.708574 | +0.700661 | −0.083641 | −0.059474 | +0.058810 | +0.996496 |
| +0.000 | +0.000 | +0.000 | +0.000 | 75.00 | 0.00 | 0 | | | | | |
| +611.650 | −315.909 | +271.860 | +0.703125 | +0.711066 | −0.000000 | −0.704924 | +0.697052 | −0.131148 | −0.093255 | +0.092213 | +0.991363 |
| +0.000 | +0.000 | +0.000 | +0.000 | 150.00 | 0.00 | 0 | | | | | |
| +677.807 | −247.562 | +271.710 | +0.703127 | +0.711064 | −0.000001 | −0.701665 | +0.693833 | −0.162055 | −0.115231 | +0.113946 | +0.986782 |
| +0.000 | +0.000 | +0.000 | +0.000 | 150.00 | 0.00 | 0 | | | | | |
| +678.863 | −248.554 | +225.565 | +0.703125 | +0.711067 | +0.000000 | −0.706107 | +0.698220 | −0.117902 | −0.083837 | +0.082900 | +0.993025 |
| +0.000 | +0.000 | +0.000 | +0.000 | 75.00 | 0.00 | 1 | | | | | |
| +681.635 | −251.277 | +193.291 | +0.703125 | +0.711066 | +0.000000 | −0.708027 | +0.700119 | −0.092364 | −0.065677 | +0.064944 | +0.995725 |
| +0.000 | +0.000 | +0.000 | +0.000 | 75.00 | 0.00 | 0 | | | | | |
| +683.173 | −252.829 | +169.726 | +0.703125 | +0.711066 | +0.000000 | −0.709100 | +0.701181 | −0.074311 | −0.052840 | +0.052250 | +0.997235 |
| +0.000 | +0.000 | +0.000 | +0.000 | 75.00 | 0.00 | 0 | | | | | |
| +681.630 | −251.281 | +193.291 | +0.703125 | +0.711066 | +0.000000 | −0.708027 | +0.700120 | −0.092360 | −0.065674 | +0.064941 | +0.995726 |
| +0.000 | +0.000 | +0.000 | +0.000 | 75.00 | 1.00 | 0 | | | | | |
| +678.844 | −248.570 | +225.565 | +0.703126 | +0.711066 | −0.000000 | −0.706107 | +0.698223 | −0.117889 | −0.083827 | +0.082891 | +0.993027 |
| +0.000 | +0.000 | +0.000 | +0.000 | 75.00 | 0.00 | 0 | | | | | |
| +677.807 | −247.565 | +271.710 | +0.703126 | +0.711065 | −0.000001 | −0.701666 | +0.693832 | −0.162056 | −0.115232 | +0.113947 | +0.986782 |
| +0.000 | +0.000 | +0.000 | +0.000 | 150.00 | 0.00 | 0 | | | | | |

STEP: 6
ROBO REFERENCE: ~1977

| | | | | | | | | | | | |
|---|---|---|---|---|---|---|---|---|---|---|---|
| +576.804 | −351.746 | +271.913 | +0.703122 | +0.711070 | +0.000000 | −0.706063 | +0.698171 | −0.118457 | −0.084231 | +0.083290 | +0.992959 |
| +0.000 | +0.000 | +0.000 | +0.000 | 150.00 | 0.00 | 0 | | | | | |
| +579.533 | −354.454 | +193.294 | +0.703125 | +0.711066 | −0.000000 | −0.710511 | +0.702576 | −0.039507 | −0.028092 | +0.027778 | +0.999219 |
| +0.000 | +0.000 | +0.000 | +0.000 | 75.00 | 0.00 | 0 | | | | | |

-continued

| | | | | | | | | | | | |
|---|---|---|---|---|---|---|---|---|---|---|---|
| +614.670 | −318.905 | +193.295 | +0.703125 | +0.711067 | −0.000000 | −0.709997 | +0.702067 | −0.054830 | −0.038988 | +0.038552 | +0.998496 |
| +0.000 | +0.000 | +0.000 | +0.000 | 75.00 | 0.50 | 1 | | | | | |
| +623.602 | −309.865 | +193.295 | +0.703125 | +0.711066 | +0.000000 | −0.709817 | +0.701890 | −0.059255 | −0.042135 | +0.041664 | +0.998243 |
| +0.000 | +0.000 | +0.000 | +0.000 | 75.00 | 0.00 | 0 | | | | | |
| +614.679 | −318.893 | +193.295 | +0.703125 | +0.711066 | +0.000000 | −0.709996 | +0.702067 | −0.054833 | −0.038990 | +0.038554 | +0.998496 |
| +0.000 | +0.000 | +0.000 | +0.000 | 75.00 | 1.00 | 0 | | | | | |
| +579.547 | −354.438 | +193.294 | +0.703126 | +0.711066 | +0.000000 | −0.710511 | +0.702576 | −0.039511 | −0.028095 | +0.027781 | +0.999219 |
| +0.000 | +0.000 | +0.000 | +0.000 | 75.00 | 0.00 | 0 | | | | | |
| +576.794 | −351.750 | +271.913 | +0.703125 | +0.711066 | −0.000000 | −0.706060 | +0.698175 | −0.118449 | −0.084225 | +0.083285 | +0.992960 |
| +0.000 | +0.000 | +0.000 | +0.000 | 150.00 | 0.50 | 0 | | | | | |
| | | | | STEP: 7 | | | | | | | |
| | | | | ROBO REFERENCE: ~1977 | | | | | | | |
| +701.934 | −220.570 | +281.411 | −0.413873 | +0.811253 | +0.413010 | −0.910312 | −0.365599 | −0.194088 | −0.006458 | −0.456295 | +0.889805 |
| +0.000 | +0.000 | +0.000 | +0.000 | 300.00 | 0.00 | 0 | | | | | |
| +694.792 | −203.033 | +239.410 | −0.413910 | +0.811243 | +0.412993 | −0.909504 | −0.387708 | −0.149948 | +0.038476 | −0.437684 | +0.898305 |
| +0.000 | +0.000 | +0.000 | +0.000 | 75.00 | 0.00 | 1 | | | | | |
| +693.527 | −188.745 | +210.244 | −0.413916 | +0.811237 | +0.412998 | −0.907974 | −0.400433 | −0.123435 | +0.065243 | −0.426083 | +0.902328 |
| +0.000 | +0.000 | +0.000 | +0.000 | 75.00 | 0.00 | 0 | | | | | |
| +692.191 | −178.544 | +188.887 | −0.413907 | +0.811240 | +0.413001 | −0.906387 | −0.409387 | −0.104234 | +0.084519 | −0.417482 | +0.904746 |
| +0.000 | +0.000 | +0.000 | +0.000 | 75.00 | 0.00 | 0 | | | | | |
| +693.452 | −188.683 | +210.284 | −0.413871 | +0.811255 | +0.413009 | −0.907992 | −0.400410 | −0.123380 | +0.065281 | −0.426072 | +0.902331 |
| +0.000 | +0.000 | +0.000 | +0.000 | 75.00 | 1.00 | 0 | | | | | |
| +694.660 | −202.864 | +239.503 | −0.413864 | +0.811256 | +0.413013 | −0.909522 | −0.387700 | −0.149862 | +0.038549 | −0.437667 | +0.898310 |
| +0.000 | +0.000 | +0.000 | +0.000 | 75.00 | 0.00 | 0 | | | | | |
| +701.882 | −220.489 | +281.453 | −0.413862 | +0.811253 | +0.413022 | −0.910317 | −0.365600 | −0.194060 | −0.006431 | −0.456295 | +0.889805 |
| +0.000 | +0.000 | +0.000 | +0.000 | 150.00 | 0.00 | 0 | | | | | |
| +672.156 | −161.069 | +311.687 | −0.414001 | +0.811206 | +0.412975 | −0.910264 | −0.371303 | −0.183174 | +0.004747 | −0.451751 | +0.892132 |
| +0.000 | +0.000 | +0.000 | +0.000 | 150.00 | 0.00 | 0 | | | | | |
| +664.981 | −143.455 | +269.714 | −0.413883 | +0.811254 | +0.412999 | −0.908736 | −0.395027 | −0.134730 | +0.053846 | −0.431070 | +0.900711 |
| +0.000 | +0.000 | +0.000 | +0.000 | 75.00 | 0.00 | 1 | | | | | |
| +663.271 | −129.378 | +240.460 | −0.413905 | +0.811242 | +0.413001 | −0.906448 | −0.409086 | −0.104881 | +0.083869 | −0.417775 | +0.904671 |
| +0.000 | +0.000 | +0.000 | +0.000 | 75.00 | 0.00 | 0 | | | | | |
| +661.247 | −119.451 | +219.055 | −0.413902 | +0.811242 | +0.413003 | −0.904151 | −0.419087 | −0.082925 | +0.105812 | −0.407739 | +0.906947 |
| +0.000 | +0.000 | +0.000 | +0.000 | 75.00 | 0.00 | 0 | | | | | |
| +663.211 | −129.314 | +240.499 | −0.413878 | +0.811252 | +0.413007 | −0.906458 | −0.409074 | −0.104842 | +0.083897 | −0.417765 | +0.904673 |
| +0.000 | +0.000 | +0.000 | +0.000 | 75.00 | 1.00 | 0 | | | | | |
| +664.881 | −143.265 | +269.811 | −0.413879 | +0.811250 | +0.413010 | −0.908735 | −0.395044 | −0.134687 | +0.053893 | −0.431060 | +0.900712 |
| +0.000 | +0.000 | +0.000 | +0.000 | 75.00 | 0.00 | 0 | | | | | |
| +671.977 | −160.946 | +311.763 | −0.413890 | +0.811242 | +0.413015 | −0.910314 | −0.371234 | −0.183067 | +0.004813 | −0.451743 | +0.892135 |
| +0.000 | +0.000 | +0.000 | +0.000 | 150.00 | 0.00 | 0 | | | | | |
| | | | | STEP: 8 | | | | | | | |
| | | | | ROBO REFERENCE: ~1977 | | | | | | | |
| +645.545 | −55.427 | +320.056 | −0.017379 | +0.961159 | −0.275447 | −0.989486 | −0.056094 | −0.133306 | −0.143579 | +0.270235 | +0.952028 |
| +0.000 | +0.000 | +0.000 | +0.000 | 300.00 | 0.00 | 0 | | | | | |
| +647.584 | −68.110 | +275.692 | −0.017398 | +0.961158 | −0.275450 | −0.995868 | −0.041216 | −0.080919 | −0.089129 | +0.272904 | +0.957904 |
| +0.000 | +0.000 | +0.000 | +0.000 | 75.00 | 0.00 | 1 | | | | | |
| +650.403 | −76.972 | +244.562 | −0.017399 | +0.961158 | −0.275449 | −0.998295 | −0.032051 | −0.048781 | −0.055715 | +0.274131 | +0.960077 |
| +0.000 | +0.000 | +0.000 | +0.000 | 75.00 | 0.00 | 0 | | | | | |
| +651.382 | −83.467 | +221.832 | −0.017397 | +0.961158 | −0.275449 | −0.999348 | −0.025428 | −0.025613 | −0.031622 | +0.274823 | +0.960975 |
| +0.000 | +0.000 | +0.000 | +0.000 | 75.00 | 0.00 | 0 | | | | | |
| +650.448 | −76.974 | +244.560 | −0.017369 | +0.961159 | −0.275447 | −0.998293 | −0.032035 | −0.048836 | −0.055763 | +0.274129 | +0.960075 |
| +0.000 | +0.000 | +0.000 | +0.000 | 75.00 | 1.00 | 0 | | | | | |
| +647.641 | −68.101 | +275.688 | −0.017367 | +0.961160 | −0.275447 | −0.995863 | −0.041202 | −0.080984 | −0.089188 | +0.272901 | +0.957899 |
| +0.000 | +0.000 | +0.000 | +0.000 | 75.00 | 0.00 | 0 | | | | | |
| +645.563 | −55.418 | +320.054 | −0.017371 | +0.961160 | −0.275446 | −0.989484 | −0.056091 | −0.133324 | −0.143596 | +0.270233 | +0.952026 |
| +0.000 | +0.000 | +0.000 | +0.000 | 150.00 | 0.00 | 0 | | | | | |
| +645.042 | +13.942 | +300.277 | −0.017366 | +0.961160 | −0.275446 | −0.992439 | −0.050048 | −0.112073 | −0.121505 | +0.271417 | +0.954761 |
| +0.000 | +0.000 | +0.000 | +0.000 | 150.00 | 0.00 | 0 | | | | | |
| +647.042 | +1.262 | +255.868 | −0.017384 | +0.961159 | −0.275448 | −0.997571 | −0.035260 | −0.060079 | −0.067458 | +0.273735 | +0.959437 |
| +0.000 | +0.000 | +0.000 | +0.000 | 75.00 | 0.00 | 1 | | | | | |
| +649.220 | −7.649 | +224.690 | −0.017362 | +0.961159 | −0.275448 | −0.999287 | −0.025916 | −0.027448 | −0.033520 | +0.274775 | +0.960924 |
| +0.000 | +0.000 | +0.000 | +0.000 | 75.00 | 0.00 | 0 | | | | | |
| +649.491 | −14.152 | +201.946 | −0.017374 | +0.961159 | −0.275448 | −0.999811 | −0.019093 | −0.003560 | −0.008680 | +0.275334 | +0.961309 |
| +0.000 | +0.000 | +0.000 | +0.000 | 75.00 | 0.00 | 0 | | | | | |
| +649.172 | −7.635 | +224.691 | −0.017395 | +0.961158 | −0.275448 | −0.999288 | −0.025933 | −0.027386 | −0.033465 | +0.274776 | +0.960926 |
| +0.000 | +0.000 | +0.000 | +0.000 | 75.00 | 1.00 | 0 | | | | | |
| +647.001 | +1.268 | +255.868 | −0.017408 | +0.961158 | −0.275450 | −0.997573 | −0.035271 | −0.060029 | −0.067412 | +0.273736 | +0.959439 |
| +0.000 | +0.000 | +0.000 | +0.000 | 75.00 | 0.00 | 0 | | | | | |
| +645.009 | +13.945 | +300.276 | −0.017383 | +0.961159 | −0.275448 | −0.992443 | −0.050055 | −0.112032 | −0.121468 | +0.271419 | +0.954766 |
| +0.000 | +0.000 | +0.000 | +0.000 | 150.00 | 0.00 | 0 | | | | | |
| | | | | STEP: 9 | | | | | | | |
| | | | | ROBO REFERENCE: ~1977 | | | | | | | |
| +655.196 | +34.266 | +298.543 | +0.522857 | +0.845297 | +0.109967 | −0.840531 | +0.532728 | −0.098537 | −0.141875 | −0.040910 | +0.989039 |
| +0.000 | +0.000 | +0.000 | +0.000 | 300.00 | 0.00 | 0 | | | | | |
| +659.212 | +37.827 | +252.593 | +0.522859 | +0.845296 | +0.109967 | −0.846182 | +0.530274 | −0.052789 | −0.102935 | −0.065451 | +0.992532 |
| +0.000 | +0.000 | +0.000 | +0.000 | 75.00 | 0.00 | 1 | | | | | |

-continued

| | | | | | | | | | | | |
|---|---|---|---|---|---|---|---|---|---|---|---|
| +662.488 | +39.932 | +220.333 | +0.522859 | +0.845296 | +0.109967 | −0.848823 | +0.528140 | −0.023824 | −0.078216 | −0.080886 | +0.993650 |
| +0.000 | +0.000 | +0.000 | +0.000 | 75.00 | 0.00 | 0 | | | | | |
| +664.004 | +42.088 | +196.822 | +0.522858 | +0.845297 | +0.109967 | −0.850267 | +0.526342 | −0.003141 | −0.060535 | −0.091859 | +0.993930 |
| +0.000 | +0.000 | +0.000 | +0.000 | 75.00 | 0.00 | 0 | | | | | |
| +662.496 | +39.920 | +220.331 | +0.522857 | +0.845298 | +0.109967 | −0.848824 | +0.528138 | −0.023831 | −0.078222 | −0.080882 | +0.993650 |
| +0.000 | +0.000 | +0.000 | +0.000 | 75.00 | 1.00 | 0 | | | | | |
| +659.212 | +37.781 | +252.587 | +0.522857 | +0.845298 | +0.109966 | −0.846183 | +0.530272 | −0.052783 | −0.102930 | −0.065454 | +0.992533 |
| +0.000 | +0.000 | +0.000 | +0.000 | 75.00 | 0.00 | 0 | | | | | |
| +655.181 | +34.221 | +298.538 | +0.522860 | +0.845296 | +0.109966 | −0.840531 | +0.532730 | −0.098518 | −0.141859 | −0.040919 | +0.989041 |
| +0.000 | +0.000 | +0.000 | +0.000 | 150.00 | 0.00 | 0 | | | | | |
| +681.647 | +78.923 | +304.169 | +0.522862 | +0.845294 | +0.109965 | −0.835756 | +0.533740 | −0.128969 | −0.167709 | −0.024471 | +0.985533 |
| +0.000 | +0.000 | +0.000 | +0.000 | 150.00 | 0.00 | 0 | | | | | |
| +685.540 | +82.569 | +258.259 | +0.522857 | +0.845297 | +0.109967 | −0.842200 | +0.532189 | −0.086456 | −0.131604 | −0.047410 | +0.990168 |
| +0.000 | +0.000 | +0.000 | +0.000 | 75.00 | 0.00 | 1 | | | | | |
| +689.865 | +84.128 | +226.082 | +0.522858 | +0.845297 | +0.109967 | −0.845346 | +0.530771 | −0.060601 | −0.109594 | −0.061274 | +0.992086 |
| +0.000 | +0.000 | +0.000 | +0.000 | 75.00 | 0.00 | 0 | | | | | |
| +692.342 | +85.656 | +202.600 | +0.522858 | +0.845297 | +0.109967 | −0.847222 | +0.529552 | −0.042299 | −0.093989 | −0.071050 | +0.993035 |
| +0.000 | +0.000 | +0.000 | +0.000 | 75.00 | 0.00 | 0 | | | | | |
| +689.855 | +84.094 | +226.078 | +0.522858 | +0.845297 | +0.109966 | −0.845347 | +0.530770 | −0.060585 | −0.109580 | −0.061282 | +0.992087 |
| +0.000 | +0.000 | +0.000 | +0.000 | 75.00 | 1.00 | 0 | | | | | |
| +685.523 | +82.527 | +258.254 | +0.522859 | +0.845296 | +0.109966 | −0.842202 | +0.532189 | −0.086433 | −0.131584 | −0.047421 | +0.990170 |
| +0.000 | +0.000 | +0.000 | +0.000 | 75.00 | 0.00 | 0 | | | | | |
| +681.637 | +78.904 | +304.166 | +0.522864 | +0.845293 | +0.109964 | −0.835757 | +0.533741 | −0.128957 | −0.167699 | −0.024476 | +0.985534 |
| +0.000 | +0.000 | +0.000 | +0.000 | 150.00 | 0.00 | 0 | | | | | |
| | | | | STEP: 10 | | | | | | | |
| | | | | ROBO REFERENCE: ~1977 | | | | | | | |
| +714.867 | +163.941 | +285.581 | +0.285202 | +0.833560 | −0.473115 | −0.955565 | +0.208895 | −0.207988 | −0.074539 | +0.511411 | +0.856098 |
| +0.000 | +0.000 | +0.000 | +0.000 | 300.00 | 0.00 | 0 | | | | | |
| +709.551 | +142.956 | +244.985 | +0.285260 | +0.833557 | −0.473084 | −0.958177 | +0.236228 | −0.161537 | −0.022895 | +0.499379 | +0.866081 |
| +0.000 | +0.000 | +0.000 | +0.000 | 75.00 | 0.00 | 1 | | | | | |
| +710.325 | +126.669 | +216.866 | +0.285292 | +0.833547 | −0.473084 | −0.958419 | +0.251465 | −0.134905 | +0.006514 | +0.491900 | +0.870627 |
| +0.000 | +0.000 | +0.000 | +0.000 | 75.00 | 0.00 | 0 | | | | | |
| +710.506 | +114.917 | +196.256 | +0.285290 | +0.833546 | −0.473086 | −0.958047 | +0.262173 | −0.115809 | +0.027498 | +0.486278 | +0.873372 |
| +0.000 | +0.000 | +0.000 | +0.000 | 75.00 | 0.00 | 0 | | | | | |
| +710.288 | +126.625 | +216.894 | +0.285265 | +0.833552 | −0.473091 | −0.958427 | +0.251449 | −0.134877 | +0.006532 | +0.491899 | +0.870628 |
| +0.000 | +0.000 | +0.000 | +0.000 | 75.00 | 1.00 | 0 | | | | | |
| +709.512 | +142.817 | +245.064 | +0.285269 | +0.833549 | −0.473093 | −0.958174 | +0.236241 | −0.161531 | −0.022880 | +0.499385 | +0.866078 |
| +0.000 | +0.000 | +0.000 | +0.000 | 75.00 | 0.00 | 0 | | | | | |
| +714.941 | +163.913 | +285.594 | +0.285295 | +0.833540 | −0.473094 | −0.955534 | +0.208956 | −0.208069 | −0.074578 | +0.511419 | +0.856089 |
| +0.000 | +0.000 | +0.000 | +0.000 | 150.00 | 0.00 | 0 | | | | | |
| +729.600 | +207.416 | +260.892 | +0.285209 | +0.833562 | −0.473107 | −0.955212 | +0.206563 | −0.211901 | −0.078906 | +0.512353 | +0.855142 |
| +0.000 | +0.000 | +0.000 | +0.000 | 150.00 | 0.00 | 0 | | | | | |
| +724.247 | +186.405 | +220.312 | +0.285280 | +0.833552 | −0.473081 | −0.957984 | +0.232693 | −0.167692 | −0.029697 | +0.501043 | +0.864913 |
| +0.000 | +0.000 | +0.000 | +0.000 | 75.00 | 0.00 | 1 | | | | | |
| +725.178 | +170.058 | +192.239 | +0.285297 | +0.833545 | −0.473083 | −0.958437 | +0.247065 | −0.142680 | −0.002048 | +0.494126 | +0.869388 |
| +0.000 | +0.000 | +0.000 | +0.000 | 75.00 | 0.00 | 0 | | | | | |
| +725.662 | +158.230 | +171.664 | +0.285293 | +0.833546 | −0.473085 | −0.958281 | +0.257079 | −0.124931 | +0.017485 | +0.488991 | +0.872114 |
| +0.000 | +0.000 | +0.000 | +0.000 | 75.00 | 0.00 | 0 | | | | | |
| +725.134 | +170.015 | +192.268 | +0.285261 | +0.833553 | −0.473092 | −0.958448 | +0.247044 | −0.142642 | −0.002025 | +0.494124 | +0.869389 |
| +0.000 | +0.000 | +0.000 | +0.000 | 75.00 | 1.00 | 0 | | | | | |
| +724.188 | +186.283 | +220.383 | +0.285260 | +0.833551 | −0.473095 | −0.957991 | +0.232692 | −0.167653 | −0.029662 | +0.501046 | +0.864912 |
| +0.000 | +0.000 | +0.000 | +0.000 | 75.00 | 0.00 | 0 | | | | | |
| +729.633 | +207.348 | +260.929 | +0.285273 | +0.833545 | −0.473098 | −0.955192 | +0.206610 | −0.211946 | −0.078919 | +0.512362 | +0.855136 |
| +0.000 | +0.000 | +0.000 | +0.000 | 150.00 | 0.00 | 0 | | | | | |
| | | | | STEP: 11 | | | | | | | |
| | | | | ROBO REFERENCE: ~1977 | | | | | | | |
| +707.521 | +222.145 | +254.718 | −0.773933 | +0.624241 | +0.106537 | −0.632835 | −0.756166 | −0.166534 | −0.023398 | −0.196307 | +0.980263 |
| +0.000 | +0.000 | +0.000 | +0.000 | 300.00 | 0.00 | 0 | | | | | |
| +704.669 | +226.234 | +208.820 | −0.773938 | +0.624237 | +0.106529 | −0.633253 | −0.763762 | −0.125134 | +0.003250 | −0.164306 | +0.986404 |
| +0.000 | +0.000 | +0.000 | +0.000 | 75.00 | 0.00 | 1 | | | | | |
| +704.568 | +231.609 | +176.763 | −0.773937 | +0.624237 | +0.106531 | −0.632985 | −0.767553 | −0.100961 | +0.018744 | −0.145570 | +0.989170 |
| +0.000 | +0.000 | +0.000 | +0.000 | 75.00 | 0.00 | 0 | | | | | |
| +704.155 | +235.148 | +153.360 | −0.773937 | +0.624238 | +0.106531 | −0.632567 | −0.769950 | −0.083875 | +0.029666 | −0.132302 | +0.990765 |
| +0.000 | +0.000 | +0.000 | +0.000 | 75.00 | 0.00 | 0 | | | | | |
| +704.534 | +231.627 | +176.768 | −0.773936 | +0.624239 | +0.106532 | −0.632986 | −0.767555 | −0.100936 | +0.018761 | −0.145552 | +0.989173 |
| +0.000 | +0.000 | +0.000 | +0.000 | 75.00 | 1.00 | 0 | | | | | |
| +704.579 | +226.287 | +208.831 | −0.773936 | +0.624239 | +0.106533 | −0.633256 | −0.763769 | −0.125074 | +0.003291 | −0.164262 | +0.986411 |
| +0.000 | +0.000 | +0.000 | +0.000 | 75.00 | 0.00 | 0 | | | | | |
| +707.527 | +222.162 | +254.719 | −0.773935 | +0.624239 | +0.106536 | −0.632832 | −0.756165 | −0.166547 | −0.023406 | −0.196316 | +0.980261 |
| +0.000 | +0.000 | +0.000 | +0.000 | 150.00 | 0.00 | 0 | | | | | |
| +598.399 | +312.233 | +270.111 | −0.773937 | +0.624238 | +0.106531 | −0.633216 | −0.764900 | −0.118175 | +0.007716 | −0.158918 | +0.987262 |
| +0.000 | +0.000 | +0.000 | +0.000 | 150.00 | 0.00 | 0 | | | | | |
| +595.625 | +316.570 | +224.168 | −0.773937 | +0.624238 | +0.106531 | −0.632082 | −0.771753 | −0.069779 | +0.038657 | −0.121342 | +0.991858 |
| +0.000 | +0.000 | +0.000 | +0.000 | 75.00 | 0.00 | 1 | | | | | |
| +594.298 | +320.494 | +191.941 | −0.773937 | +0.624238 | +0.106532 | −0.630603 | −0.775106 | −0.039386 | +0.057987 | −0.097661 | +0.993529 |
| +0.000 | +0.000 | +0.000 | +0.000 | 75.00 | 0.00 | 0 | | | | | |

-continued

| | | | | | | | | | | | |
|---|---|---|---|---|---|---|---|---|---|---|---|
| +592.698 | +322.505 | +168.425 | −0.773937 | +0.624238 | +0.106532 | −0.629164 | −0.777078 | −0.017377 | +0.071936 | −0.080474 | +0.994157 |
| +0.000 | +0.000 | +0.000 | +0.000 | 75.00 | 0.00 | 0 | | | | | |
| +594.288 | +320.503 | +191.942 | −0.773937 | +0.624238 | +0.106532 | −0.630602 | −0.775106 | −0.039380 | +0.057991 | −0.097657 | +0.993529 |
| +0.000 | +0.000 | +0.000 | +0.000 | 75.00 | 1.00 | 0 | | | | | |
| +595.595 | +316.594 | +224.172 | −0.773937 | +0.624238 | +0.106532 | −0.632082 | −0.771755 | −0.069766 | +0.038666 | −0.121331 | +0.991859 |
| +0.000 | +0.000 | +0.000 | +0.000 | 75.00 | 0.00 | 0 | | | | | |
| +598.369 | +312.253 | +270.115 | −0.773936 | +0.624238 | +0.106533 | −0.633216 | −0.764902 | −0.118162 | +0.007726 | −0.158908 | +0.987263 |
| +0.000 | +0.000 | +0.000 | +0.000 | 150.00 | 0.00 | 0 | | | | | |
| | | | | STEP: 12 | | | | | | | |
| | | | | ROBO REFERENCE: ~1977 | | | | | | | |
| +559.982 | +343.786 | +275.486 | −0.773938 | +0.624236 | +0.106531 | −0.633056 | −0.766940 | −0.105080 | +0.016108 | −0.148766 | +0.988741 |
| +0.000 | +0.000 | +0.000 | +0.000 | 150.00 | 0.00 | 0 | | | | | |
| +555.669 | +351.734 | +197.257 | −0.773936 | +0.624239 | +0.106532 | −0.629519 | −0.776663 | −0.022384 | +0.068766 | −0.084388 | +0.994057 |
| +0.000 | +0.000 | +0.000 | +0.000 | 75.00 | 0.00 | 0 | | | | | |
| +594.223 | +320.575 | +191.951 | −0.773939 | +0.624235 | +0.106532 | −0.630598 | −0.775111 | −0.039360 | +0.058004 | −0.097641 | +0.993530 |
| +0.000 | +0.000 | +0.000 | +0.000 | 75.00 | 0.50 | 1 | | | | | |
| +604.088 | +312.595 | +190.593 | −0.773937 | +0.624238 | +0.106532 | −0.630874 | −0.774627 | −0.044169 | +0.054950 | −0.101393 | +0.993328 |
| +0.000 | +0.000 | +0.000 | +0.000 | 75.00 | 0.00 | 0 | | | | | |
| +594.326 | +320.472 | +191.937 | −0.773937 | +0.624238 | +0.106532 | −0.630603 | −0.775105 | −0.039398 | +0.057979 | −0.097671 | +0.993528 |
| +0.000 | +0.000 | +0.000 | +0.000 | 75.00 | 1.00 | 0 | | | | | |
| +555.793 | +351.614 | +197.240 | −0.773934 | +0.624242 | +0.106532 | −0.629525 | −0.776657 | −0.022422 | +0.068742 | −0.084417 | +0.994056 |
| +0.000 | +0.000 | +0.000 | +0.000 | 75.00 | 0.00 | 0 | | | | | |
| +559.948 | +343.798 | +275.489 | −0.773937 | +0.624238 | +0.106532 | −0.633058 | −0.766942 | −0.105058 | +0.016123 | −0.148749 | +0.988743 |
| +0.000 | +0.000 | +0.000 | +0.000 | 150.00 | 0.50 | 0 | | | | | |

Although the above-disclosed embodiments have shown, described, and pointed out the fundamental novel features of the inventions as applied to the above-disclosed embodiments, it should be understood that various omissions, substitutions, and changes in the form of the detail of the devices, systems, and/or methods shown may be made by those skilled in the art without departing from the scope of the invention. Consequently, the scope of the inventions should not be limited to the foregoing description, but should be defined by the claims, where claim language carries an ordinary meaning as in customary usage and not by special definition unless specifically stated as providing a definition.

What is claimed is:

1. A system for providing support for an object to be measured by an articulator, comprising:
   a definition data;
   a controller configured so as to determine one or more support locations for said object based on said definition data; and
   one or more support members that can be moved to said support locations to provide said support for said object, wherein each of said one or more support members comprises a base that allows lateral movement of said support member, and a retractable member that provides adjustable height for the support location corresponding to said support member.

2. The system of claim 1, wherein said one or more support members are moved by said articulator based on known starting locations of said one or more support members and said one or more support locations.

3. The system of claim 1, wherein said one or more support members are moved manually to said one or more support locations, said movements facilitated by said articulator being positioned at said one or more support locations.

4. The system of claim 1, wherein said retractable member comprises a retractable tape.

5. The system of claim 1, wherein said support member further comprises a blocking member that inhibits downward movement of said retractable member.

6. The system of claim 5, wherein said blocking member is actuated by said articulator.

7. The system of claim 1, wherein said support member further comprises a stability enhancing member that selectively provides additional stability of said support member.

8. The system of claim 1, further comprising a return facilitating member disposed on said support member and a nesting assembly configured to receive said return facilitating member.

9. A system for providing support for an object to be measured by an articulator, comprising:
   a definition data; and
   a controller configured so as to determine one or more support locations for said object based on said definition data,
   wherein said controller is further configured so as to:
      obtain measurements of said object by movements of said articulator, said
   articulator movements based on said definition data;
      compare said object measurements with said definition data; and to
      perform a post-comparison operation.

10. The system of claim 9, wherein said post-comparison operation comprises identifying of differences between said object measurements and said definition data.

11. The system of claim 9, wherein said post-comparison operation comprises marking of said object based on said comparison.

12. A system for providing support for an object to be measured by an articulator, comprising:
   a definition data; and
   a controller configured so as to determine one or more support locations for said object based on said definition data,
   wherein said controller is further configured so as to obtain measurements of said object by movements of said articulator, said articulator movements based on said definition data, and
   wherein said controller is further configured so as to adjust said articulator movements to account for deviations of said object from said definition data.

13. A method for providing support for an object to be measured by an articulator, comprising:

obtaining a definition data;

determining one or more support locations for said object based on said definition data;

obtaining measurements of said object by movements of said articulator, said articulator movements based on said definition data;

comparing said object measurements with said definition data; and performing a post-comparison operation.

14. The method of claim 13, further comprising generating signals for said articulator, said signals resulting in movements of one or more support members to said support locations to provide said support for said object.

15. The method of claim 14, wherein said one or more support members are moved by said articulator based on known starting locations of said one or more support members and said one or more support locations.

16. The method of claim 14, wherein said one or more support members are moved manually to said one or more support locations, said movements facilitated by said articulator being positioned at said one or more support locations.

17. The method of claim 13, wherein said post-comparison operation comprises identifying differences between said object measurements and said definition data.

18. The method of claim 13, wherein said post-comparison operation comprises marking said object based on said comparison.

19. A method for providing support for an object to be measured by an articulator, comprising:

obtaining a definition data;

determining one or more support locations for said object based on said definition data;

obtaining measurements of said object by movements of said articulator, said articulator movements based on said definition data; and adjusting said articulator movements to account for deviations of said object from said definition data.

* * * * *